US011939032B2

(12) United States Patent
Boo et al.

(10) Patent No.: US 11,939,032 B2
(45) Date of Patent: *Mar. 26, 2024

(54) FLOATING-TYPE FOUNDATION FOR SUPPORTING A WIND POWER GENERATION SYSTEM AND INCLUDING A STABILIZED POWER CABLE, SYSTEM OF FLOATING-TYPE FOUNDATIONS, AND A METHOD OF STABILIZING THE POWER CABLE

(71) Applicant: VL Offshore, LLC, Houston, TX (US)

(72) Inventors: Sung Youn Boo, Houston, TX (US); Steffen A. Shelley, Houston, TX (US)

(73) Assignee: VL Offshore, LLC, Houston, TX (US)

( * ) Notice: Subject to any disclaimer, the term of this patent is extended or adjusted under 35 U.S.C. 154(b) by 196 days.

This patent is subject to a terminal disclaimer.

(21) Appl. No.: 17/330,194

(22) Filed: May 25, 2021

(65) Prior Publication Data
US 2021/0276673 A1    Sep. 9, 2021

Related U.S. Application Data

(63) Continuation-in-part of application No. 16/281,546, filed on Feb. 21, 2019, now Pat. No. 11,014,637.

(51) Int. Cl.
*B63B 35/44*    (2006.01)
*B63B 21/26*    (2006.01)
(Continued)

(52) U.S. Cl.
CPC .............. *B63B 35/44* (2013.01); *B63B 21/26* (2013.01); *B63B 22/00* (2013.01); *F03D 13/25* (2016.05);
(Continued)

(58) Field of Classification Search
CPC ......... B63B 35/00; B63B 35/44; B63B 21/00; B63B 21/26; B63B 22/00; F03D 13/00; F03D 13/25
(Continued)

(56) References Cited

U.S. PATENT DOCUMENTS 3,224,401 A    12/1965 Kobus
6,102,625 A    8/2000 Olsen et al.
(Continued)

FOREIGN PATENT DOCUMENTS

CN    102758446 A    10/2012
CN    102758447 A    10/2012
(Continued)

OTHER PUBLICATIONS

Ky H. Vu et al., "Hydrodynamic Damping due to Porous Plates", School of Oil and Gas Engineering The University of Western Australia, 35 Stirling Highway Crawley, WA 6009 Perth Australia.
(Continued)

*Primary Examiner* — Lars A Olson
(74) *Attorney, Agent, or Firm* — Bridgeway IP Law Group, PLLC; Hyun Woo Shin; Sang Ho Lee

(57) ABSTRACT

Provided is a floating foundation for supporting a wind power generation system including a stabilized power cable. In one embodiment, the floating foundation includes a column extending upwardly and couplable at a top end thereof to a base of the wind turbine, at least one power cable for exporting power generated from the wind turbine to another floating foundation or to an offshore/onshore station, and a plurality of buoyancy modules disposed along the at least one power cable. Power cables between a plurality of floating foundations and/or power station may be supported by buoyant modules such that the power cable is located in
(Continued)

an optimal submergence range of the water body in which the floating foundations are deployed.

20 Claims, 34 Drawing Sheets

(51) Int. Cl.
  *B63B 22/00* (2006.01)
  *F03D 13/25* (2016.01)
(52) U.S. Cl.
  CPC ..... *B63B 2035/446* (2013.01); *F05B 2240/93* (2013.01)
(58) Field of Classification Search
  USPC .......................................................... 114/266
  See application file for complete search history.

(56) References Cited

U.S. PATENT DOCUMENTS

| | | | |
|---|---|---|---|
| 7,086,809 | B2 | 8/2006 | Busso |
| 7,819,073 | B2 | 10/2010 | Sveen et al. |
| 8,418,640 | B2 | 4/2013 | Leverette |
| 8,471,396 | B2 | 6/2013 | Roddier et al. |
| 8,692,401 | B2 | 4/2014 | Roddier et al. |
| 9,139,266 | B2 | 9/2015 | Roddier et al. |
| 9,238,896 | B2 | 1/2016 | Borrel et al. |
| 9,316,209 | B2 | 4/2016 | Li et al. |
| 9,518,564 | B2 | 12/2016 | Dagher et al. |
| 9,522,716 | B2 | 12/2016 | Tsouroukdissian |
| 9,964,097 | B2 | 5/2018 | Dagher et al. |
| 11,014,637 | B2 * | 5/2021 | Boo ................ B63B 35/44 |
| 2006/0165493 | A1 | 7/2006 | Nim |
| 2010/0008733 | A1 | 1/2010 | Gong et al. |
| 2011/0074155 | A1 | 3/2011 | Scholte-Wassink |
| 2011/0126750 | A1 | 6/2011 | Leverette |
| 2011/0148115 | A1 | 6/2011 | Samuel et al. |
| 2012/0014752 | A1 | 1/2012 | Caruso |
| 2012/0073487 | A1 | 3/2012 | Pantaleon et al. |
| 2013/0233231 | A1 | 9/2013 | Dagher et al. |
| 2014/0305359 | A1 | 10/2014 | Lambrakos et al. |
| 2015/0259044 | A1 | 9/2015 | López et al. |
| 2016/0101833 | A1 | 4/2016 | Gilloteaux et al. |
| 2017/0320543 | A1 | 11/2017 | Hong et al. |
| 2018/0030963 | A1 | 2/2018 | Anthony et al. |

FOREIGN PATENT DOCUMENTS

| | | |
|---|---|---|
| CN | 104401458 A | 3/2015 |
| CN | 107021190 A | 8/2017 |
| CN | 107963186 A | 4/2018 |
| GB | 1048776 A | 11/1966 |
| JP | 2000501043 A | 2/2000 |
| JP | 2000247291 A | 9/2000 |
| JP | 2012131297 A | 7/2012 |
| JP | 2014-061848 A | 4/2014 |
| JP | 2019534206 A | 11/2019 |
| KR | 10-2016-0056051 A | 5/2016 |
| KR | 101665811 B1 | 10/2016 |
| NL | 6504623 A | 10/1965 |
| WO | 2009/131826 A2 | 10/2009 |
| WO | 2010/104565 A2 | 9/2010 |
| WO | 2014031009 A1 | 2/2014 |
| WO | 2018122220 A1 | 7/2018 |
| WO | 2018185309 A1 | 10/2018 |
| WO | 2018/197644 A1 | 11/2018 |

OTHER PUBLICATIONS

Bulder et al. "Studie narr haalbaarheid van en randvoorwaarden voor drijvende offshore windturbines (Study to feasibility of and boundary conditions for floating offshore wind turbines)" Dec. 2012.

A. Robertson, J. et al. "Definition of the Semisubmersible Floating System for Phase II of OC4", Sep. 2014, National Renewable Energy Laboratory (NREL).

* cited by examiner

FLOATING-TYPE FOUNDATION FOR SUPPORTING A WIND POWER GENERATION SYSTEM AND INCLUDING A STABILIZED POWER CABLE, SYSTEM OF FLOATING-TYPE FOUNDATIONS, AND A METHOD OF STABILIZING THE POWER CABLE

TECHNICAL FIELD

The present disclosure relates to a marine structure, and more particularly, to offshore floating-type foundations for supporting a wind power generation system.

BACKGROUND

Wind turbines, both horizontal axis and vertical axis types, are used to generate electrical power by transforming wind kinetic energy into electrical energy. The majority of wind turbines used to produce energy have been installed onshore and offshore in coastal waters. A large number of wind turbines have been installed on fixed foundations of single towers (mono-piles), gravity bases or lattice structures (jackets) in coastal waters to a water depth of around 40 meters. However at greater water depths, fixed foundations become economically or technically infeasible. Therefore, using floating foundations for offshore wind is required as the power generating industry moves further offshore. The advantages of using floating foundations for offshore wind are that (1) more power can be generated due to the uniform and higher velocity winds that are observed further offshore; (2) locating wind turbines further offshore reduces or eliminates sight-line issues from shore; and (3) locating wind turbines outside of coastal zones reduces impacts on coastal recreational areas or fisheries.

Current floating wind foundation technology include various types of floating wind foundations, such as semi-submersible, spar, tension leg platform (TLP), and barge. FIG. 1 shows a conventional semi-submersible floating foundation, which includes three buoyant columns coupled to each other via tubular and structural shape truss systems. At the bottom of each buoyant column, there are horizontal structurally framed damping plates.

Additionally, conventional floating foundations include internal ballast systems, which arrange ballast flow lines, valves and fittings inside a floating foundation. There are several disadvantages to an internal ballast system, including: (a) can be very expensive to fabricate, involving a plurality of penetrations through critical, internal structural members; (b) may be location restricted because of the arrangement of critical internal structural members; and (c) requires internal inspection, which in turn requires internal access to the floating foundation along with all the complexity and safety issues that arise with inspecting enclosed spaces.

Further, floating foundations in operation are connected with one another to form a plurality of interconnected network of wind power generating units, and the generated power should be efficiently transferred between the floating foundations and to the onshore/offshore station. Furthermore, such network of floating foundations should provide an accessible method or system to connect, disconnect, reconnect, and maintain the individual floating foundation units.

Conventional floating foundations to date are either uneconomical due to design shortcomings, or suffer from poor hydrodynamic performance which in turn reduces power production and revenue, thereby also making the designs uneconomical.

Therefore, what is clearly needed is a floating foundation design that (1) is inexpensive to build and maintain; (2) minimizes dynamic responses and load transfer to the wind turbine system; (3) is able to be moored in deep-water; and (4) transfers power efficiently between a plurality of the floating foundation units in an offshore operation.

SUMMARY OF THE DISCLOSURE

An embodiment of the semi-submersible floating foundation for supporting a wind power generating system including a wind turbine of the present disclosure includes a column extending upwardly and couplable at a top end thereof to a base of the wind turbine, at least one power cable for exporting power generated from the wind turbine to another floating foundation or to an offshore/onshore station, and a plurality of buoyancy modules disposed along the at least one power cable.

In another embodiment, the at least one power cable is an inter-array power cable for transferring the generated power to or from the another floating foundation and/or an export power cable for exporting the generated power to the offshore or onshore station.

In another embodiment, when the inter-array power cable is in a connected configuration, a hang-off angle of the inter-array power cable may be between 30 and 50 degrees with respect to a vertical axis of the column of the floating foundation to which the inter-array power cable is coupled.

In another embodiment, when export power cable is in a connected configuration, a hang-off angle of the export power cable may be between 3 and 20 degrees with respect to a vertical axis of the column of the floating foundation to which the export power cable is coupled.

In another embodiment, a number and position of the plurality of buoyancy modules on the at least one power cable may be adjusted to obtain an optimal hang-off angle of the at least one power cable.

In another embodiment, the at least one power cable may be located in an optimal submergence range of a water body in which the floating foundation is deployed, and a number and position of the plurality of buoyancy modules on the at least one power cable may be adjusted to place the at least one power cable in the optimal submergence range.

In yet another embodiment, the floating foundation of the present disclosure may include a column extending upwardly and couplable at a top end thereof to a base of the wind turbine, and a station keeping system, and the station keeping system includes at least one semi-taut or taut mooring line detachably attached to the floating foundation at one end and detachably attached to a seabed anchor at the other end thereof, and fittings that connect the semi-taut or taut mooring line to the floating foundation and to the seabed anchor, and the at least one semi-taut or taut mooring line is configured to connect, disconnect, and reconnect to the fittings of the mooring line and of the seabed anchor, and when the semi-taut or taut mooring line is connected to the floating foundation and the seabed anchor, a departure angle of the at least one semi-taut or taut mooring line is between 35 and 55 degrees with respect to a vertical axis of the column.

In yet another embodiment, a system of floating foundations for supporting a plurality of wind turbines that generate power may include a plurality of floating foundations and at least one power cable that is an inter-array power cable for transferring generated power between the plurality of floating foundations and/or an export power cable for exporting the generated power to an offshore/onshore station, and each of the plurality of floating foundations includes a column extending upwardly and couplable at a top end thereof to a base of a wind turbine;

In another embodiment, when the inter-array power cable is in a connected configuration, a hang-off angle of the inter-array power cable is between 30 and 50 degrees with respect to a vertical axis of a column of a floating foundation to which the inter-array power cable is coupled.

In another embodiment, wherein when export power cable is in a connected configuration, a hang-off angle of the export power cable is between 3 and 20 degrees with respect to a vertical axis of a column of a floating foundation to which the export power cable is coupled.

In another embodiment, a plurality of buoyancy modules are disposed along the at least one power cable.

In another embodiment, a number and position of the plurality of buoyancy modules on the at least one power cable are adjusted to obtain an optimal hang-off angle of the at least one power cable.

In another embodiment, the at least one power cable is located in an optimal submergence range of a water body in which the floating foundation is deployed, and a number and positions of the plurality of buoyancy modules on the at least one power cable are adjusted to place the at least one power cable in the optimal submergence range.

In yet another embodiment, the present disclosure includes a method of stabilizing a power cable connected to a floating foundation supporting a wind turbine, the method including determining an optimal number and position of a plurality of buoyancy modules to be disposed on at least one power cable, installing the plurality of buoyancy modules in the at least one power cable according to the determined optimal number and position, deploying the floating foundation and the at least one power cable into a water body, and the at least one power cable is an inter-array power cable for transferring power generated by the wind turbine to or from another floating foundation and/or an export power cable for exporting the generated power to an offshore/onshore station, and the optimal number and position of the plurality of buoyancy modules are determined based on at least a distance between the floating foundation and the another floating foundation or the offshore/onshore station, and the at least one power cable with the plurality of buoyancy modules is positioned in an optimal submergence range of the water body due to the number and position of the plurality of buoyancy modules.

In another embodiment, when the inter-array power cable is in a connected configuration, a hang-off angle of the inter-array power cable is between 30 and 50 degrees with respect to a vertical axis of a column of the floating foundation to which the wind turbine is coupled.

In another embodiment, when export power cable is in a connected configuration, a hang-off angle of the export power cable is between 3 and 20 degrees with respect to a vertical axis of a column of the floating foundation to which the wind turbine is coupled.

In another embodiment, the determining the optimal number and position of the plurality of buoyancy modules includes determining the optimal submergence range of the water body based on an average wave period or a spectral wave peak period of the water body, and determining the optimal number and positions of the plurality of buoyancy modules based on at least the optimal submergence range and the distance between the floating foundation and the another floating foundation or the offshore/onshore station.

BRIEF DESCRIPTION OF THE DRAWINGS

The features and advantages of the present disclosure will become more apparent to those of ordinary skill in the art by describing exemplary embodiments thereof in detail with reference to the accompanying drawings, in which.

Figure 1:
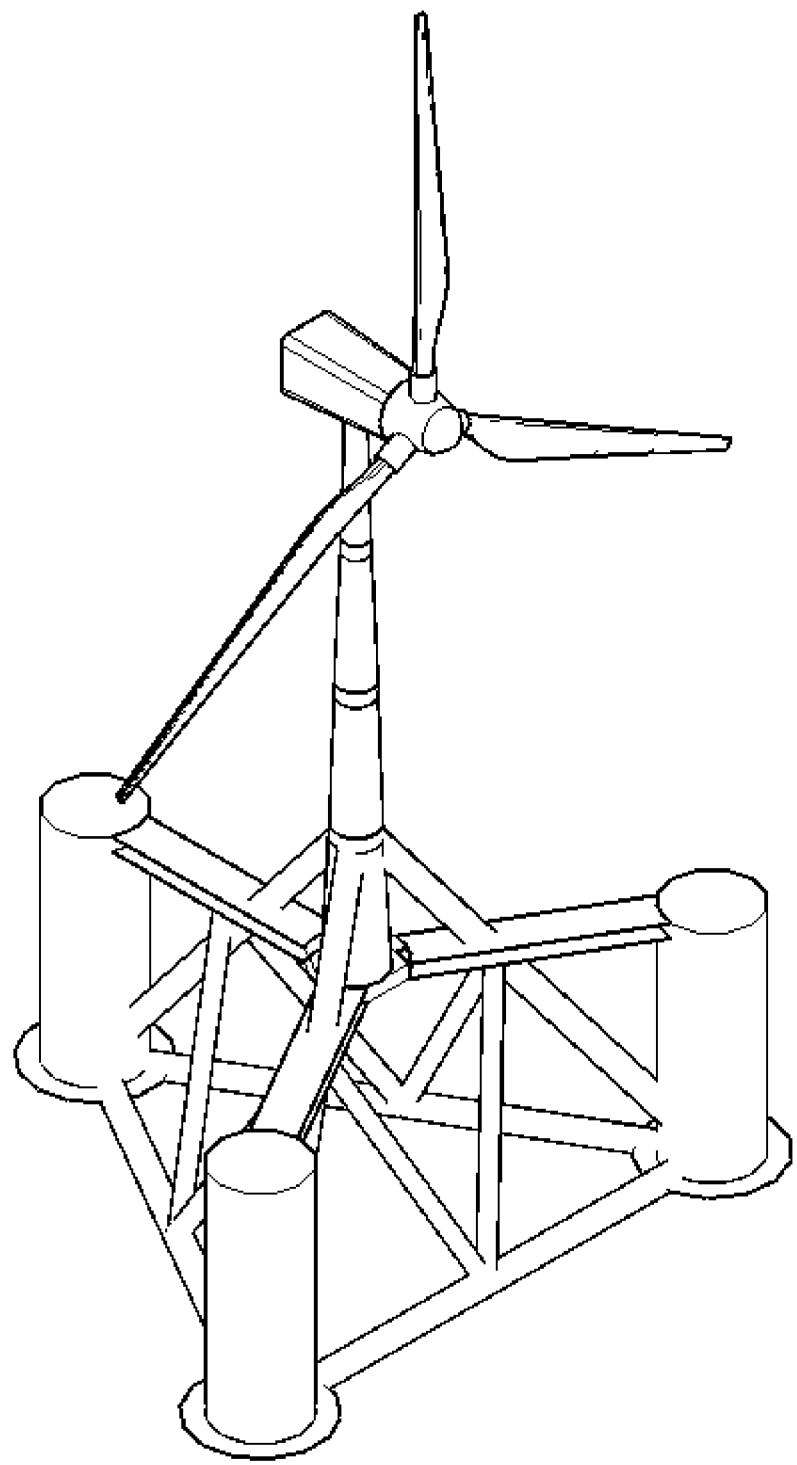
FIG. 1 shows a conventional semi-submersible floating foundation.

While the drawing figures show aspects of the present disclosure applied to semi-submersible floating foundations, a skilled artisan of the art would readily apply them in other types of floating foundations, e.g., spar, TLP, and barge types.

DETAILED DESCRIPTION

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the present disclosure.

In one embodiment, a semi-submersible floating foundation is provided for supporting a wind turbine system of horizontal axis wind turbine (HAWT) or vertical axis wind turbine (VAWT). The floating foundation without braces or deck structures includes buoyant columns, buoyant structural pontoons, motion attenuating extensions, and station-keeping systems of semi-taut or taut line mooring for deep water depths. For a plurality of floating foundation installation, an inter-array power cable and export power cable provide a means of transferring power. The present disclosure is described in enabling detail in the following examples, which may represent more than one embodiment of the present disclosure.

Figure 2A:
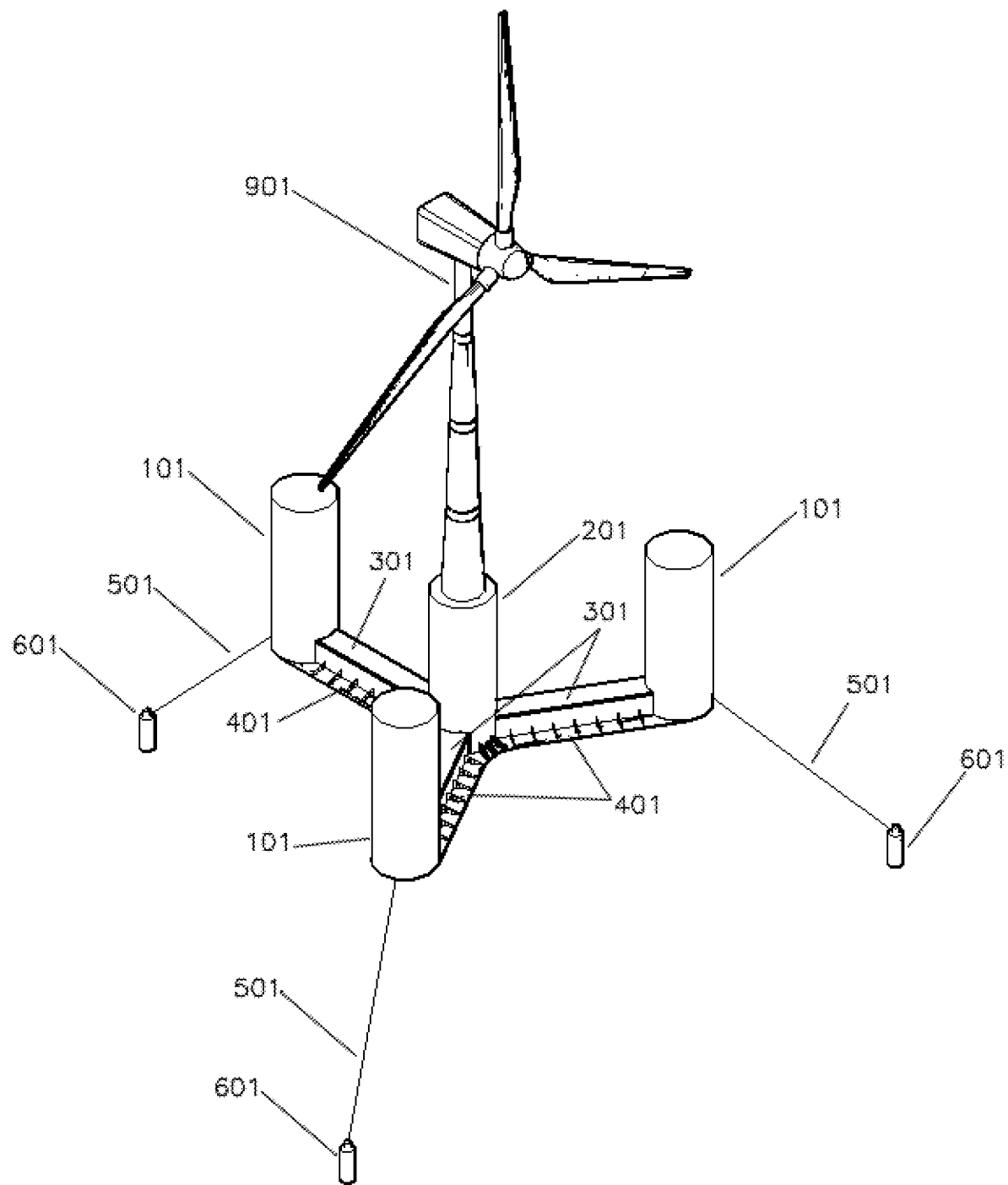
FIG. 2A is an isometric view of a floating foundation according to an embodiment of the present disclosure with a horizontal axis wind turbine system installed.
Figure 2B:
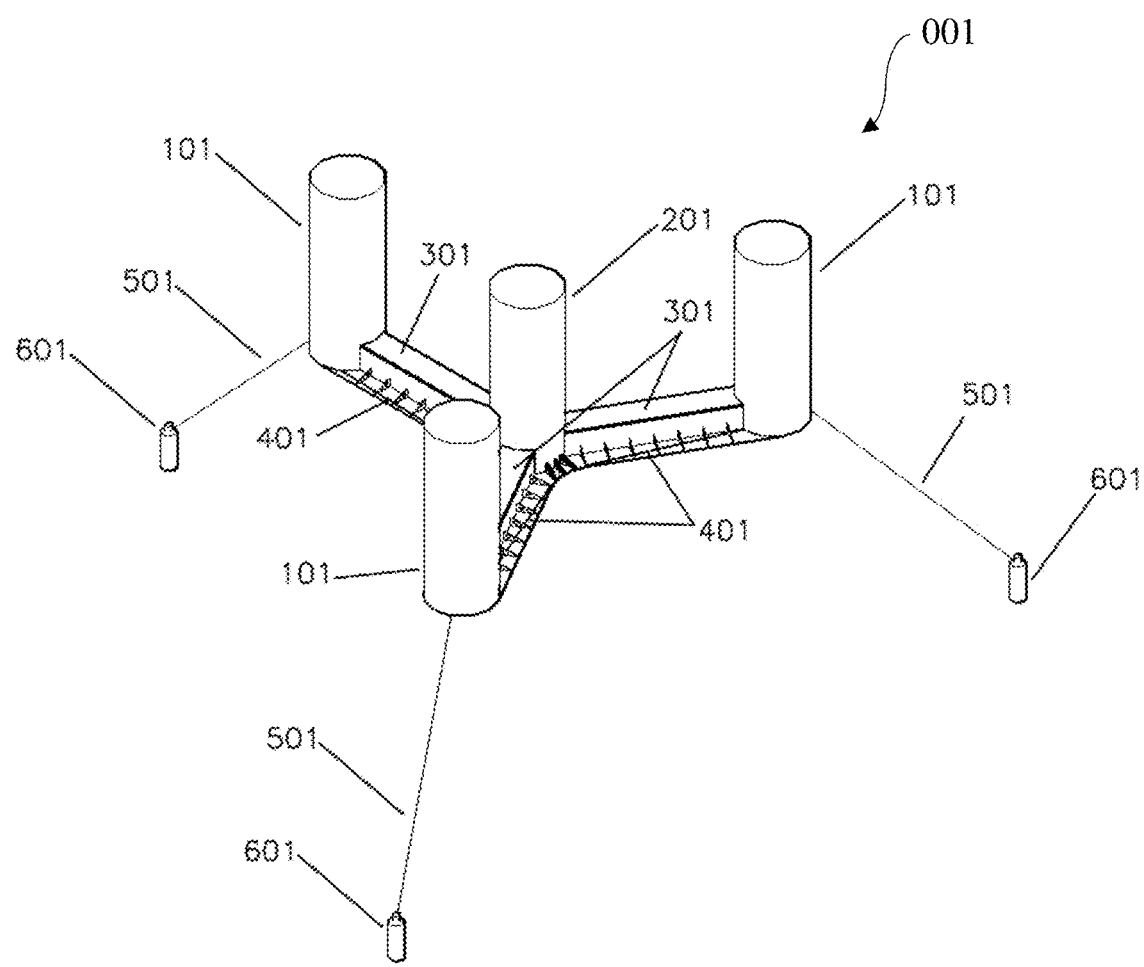
FIG. 2B is an isometric view indicating an embodiment of the disclosure without a wind turbine system installed.

Referring to FIGS. 2A and 2B, a semi-submersible floating foundation 001 according to an embodiment of the present disclosure includes a plurality of outer buoyant columns 101 which is parallel to a center buoyant column 201 supporting a wind turbine system 901. The outer buoyant columns 101 are positioned at an equal radial distance from the center of the center buoyant column and equal angle between the outer buoyant columns. The outer buoyant columns 101 are coupled to the center buoyant column 201 by continuous structural buoyant pontoons 301, which form a base of the floating foundation 001. Along the continuous structural pontoons 301 are disposed motion attenuating extensions 401 according to an embodiment of the disclosure. In FIG. 2A, the shape of the center buoyant column 201 and the outer buoyant columns 101 are circular cylindrical. For station-keeping, semi-taut or taut line mooring lines 501 couple the floating foundation 001 to seabed anchors 601. A horizontal axis wind turbine energy system 901 is installed at and supported by a top end of the center buoyant column 201.

Different types of wind turbine energy system may be installed at the top end of the center buoyant column 201. As a non-limiting example, a vertical axis wind turbine energy system may be installed at and supported by the center buoyant column 201.

FIG. 2B shows the floating foundation 001 without a wind turbine system installed at the top end of the center buoyant column 201.

The shape of the center buoyant column 201 and outer buoyant columns 101 is shown as being circular cylindrical in FIGS. 2A and 2B. In another embodiment of the present disclosure, the center buoyant column 201 and/or the plurality of the outer buoyant columns 101 may be polygonal/prismoidal shape having a plurality of sides. For example, the center and outer buoyant columns may be cylindrical having a square, rectangular, hexagonal, or other polygonal/prismoidal horizontal cross-section.

Varying the shape of the outer buoyant columns 101 and center buoyant column 201 allows for adapting and optimizing the columns for fabrication purposes. Not every fabrication yard is able to roll cylindrical circular shapes of the size needed for a floating foundation 001 for supporting a wind power generation system. However, every fabrication yard does have a panel line on which it can produce stiffened panel sections efficiently. Thus, incorporating various polygonal shaped columns can allow for optimizing the columns to fit within the width of the panel lines for various fabrication yards. This in turn increases the number of potential suppliers for the floating foundation 001, which in turn, reduces the cost of manufacturing the floating foundation 001.

Figure 3:
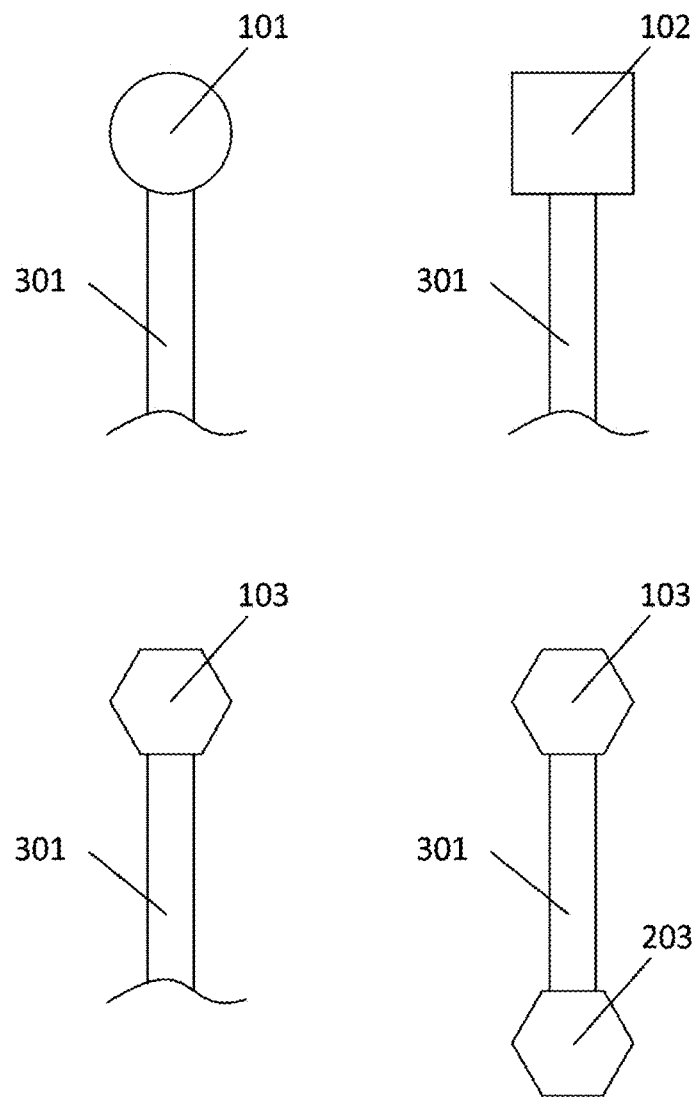
FIG. 3 is a plan view illustrating the differences in connections of pontoons to outer buoyant columns having a circular or a flat surface.

Referring to FIG. 3, a bird's eye view of an outer buoyant columns 101 attached to a pontoon 301 is shown, where one outer buoyant column 101 has a circular cylindrical shape and others are shown to have a square 102, and hexagonal shape 103. It can be seen that another significant benefit of polygonal-shaped outer buoyant columns 103 and hexagonal shape of center buoyant column 203 instead of a cylindrical one 101, is that attachment of the pontoons 301 to polygonal outer and center columns are easier. It is less difficult to weld and to inspect the welds of structures that attach perpendicularly at boundaries.

The diameter or width of the center buoyant column 201 may be less than the diameter or width of the outer buoyant columns 101, but not less than the tower base diameter of the wind turbine system 901.

Figure 4:
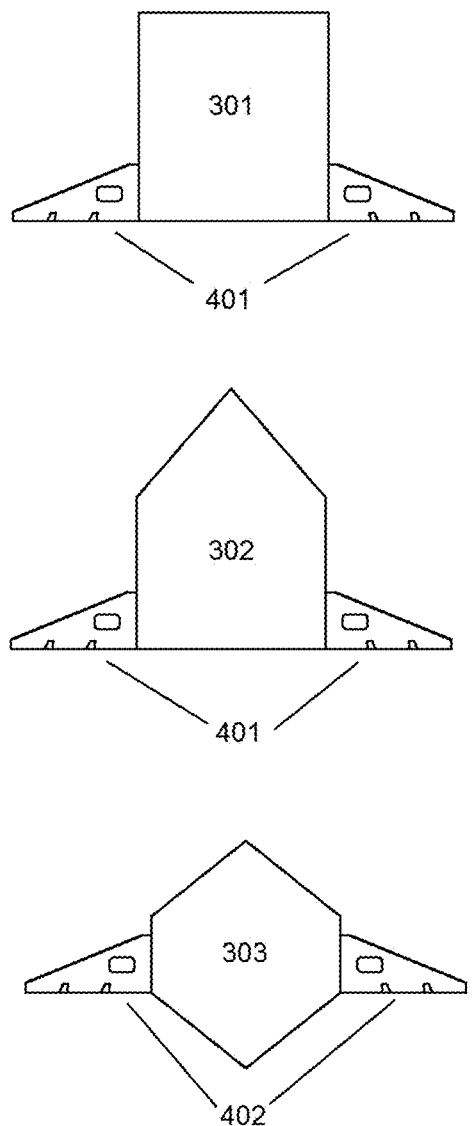
FIG. 4 shows various cross-section views of structural pontoons showing different geometries according to an embodiment of the present disclosure.

Referring now to FIG. 4, the cross sectional shape of the pontoons 301 of the floating foundation 001 may be square or rectangular 301 or polygonal with a plurality of sides 302, 303 or combinations of the shapes.

Outer buoyant columns 101, center buoyant column 201 and structurally continuous buoyant structural pontoons 301 may include a plurality of watertight structures (not shown) resulting in subdivision of the columns 101 201 or pontoons 301 that provide hydrostatic stability against progressive flooding or for ballast requirements. Subdivision may consist of a plurality of vertical watertight structures (bulkheads) or horizontal watertight structures (decks).

Coupling or installing of the wind turbine system 901 to a top end of the center buoyant column 201 may be done by welding, bolting, or casting. Welding may comprise continuous or partially continuous, fillet, partial-penetration and full penetration welds or any combination thereof. Bolting may be through flange couplings that are continuous or intermittent, or through a plurality of brackets and fittings. Bolting connections may also include polymer sealants and gaskets, or a combination thereof.

Figure 5A:
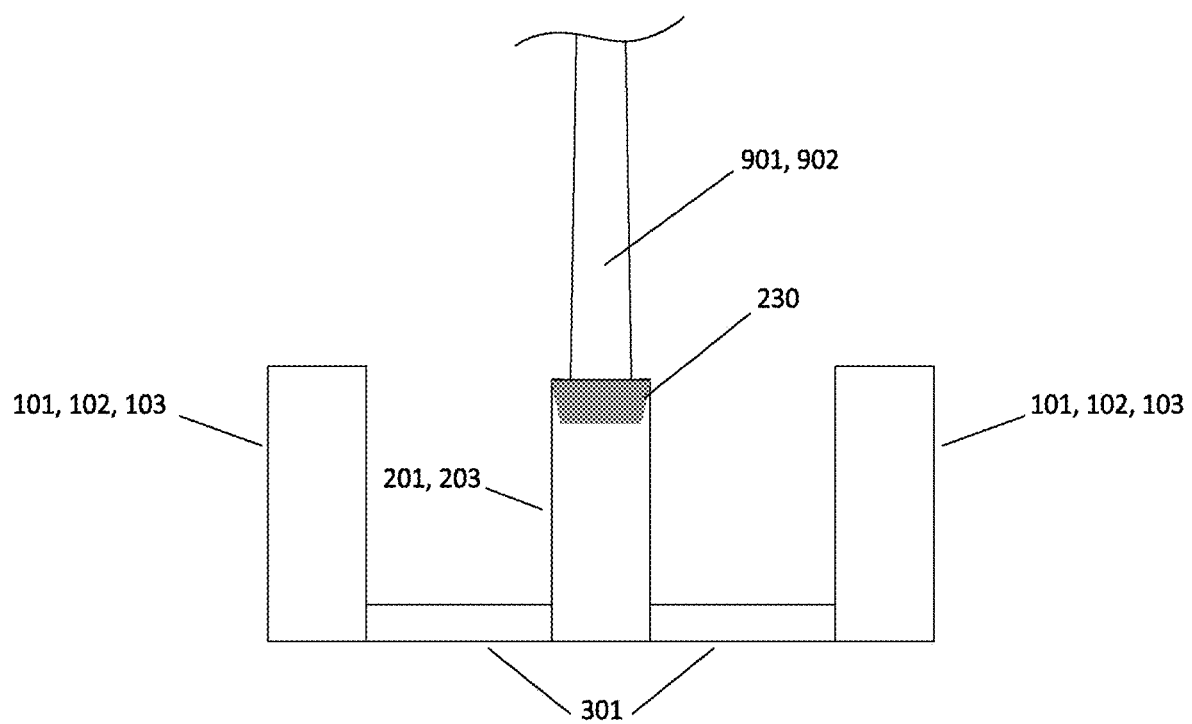
FIG. 5A is an elevation view of a method of coupling a wind turbine system to the center buoyant column of the floating foundation using a casting according to an embodiment of the disclosure.

With reference to FIG. 5A, an embodiment of the disclosure may include a casting 230 between the wind turbine system 901 and the center buoyant columns 201 of the floating foundation 001. The casting 230 may comprise a single piece or a plurality of pieces and may form the structure of the center buoyant column 201 or form the base of the wind turbine system 901. Coupling of the casting 230 to the wind turbine system 901 or to the center buoyant column 201 may include welding, bolting or a combination thereof.

Figure 5B:
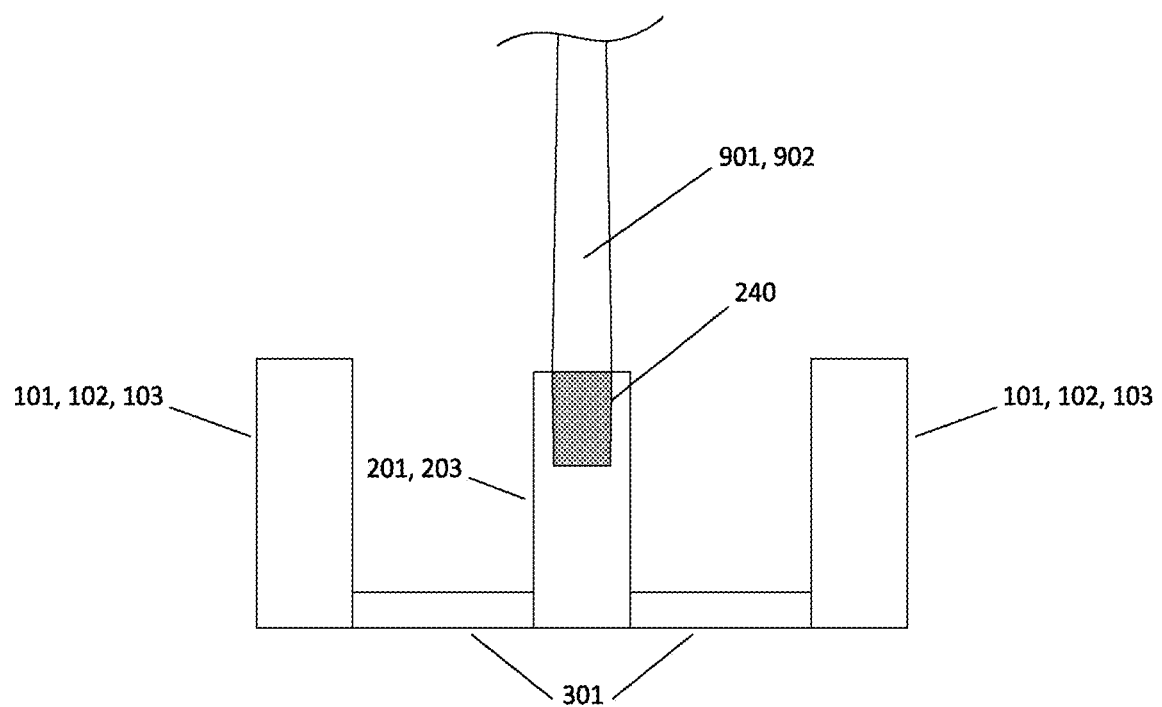
FIG. 5B is an elevation view of a method of coupling a wind turbine system to the center buoyant column of the floating foundation using a hybrid structure according to an embodiment of the disclosure.

With reference to FIG. 5B, another embodiment of the disclosure includes a steel and concrete-reinforced or steel and polymer-reinforced structural system 240, which is called a hybrid structural system 240 The hybrid structural system 240 may be extended from the middle of the height of the center buoyant column 201 to two meters above the top end of the center buoyant column 201. The hybrid structural system 240 comprises a single piece or a plurality of pieces of concrete or polymer reinforced steel assemblies and may form a structural part of the center buoyant column 201 or form a structural part of the base of the wind turbine system 901. Coupling of the hybrid structural system 240 to the wind turbine system 901 or the center buoyant column 201 may be done by welding or bolting.

Similar to the methods for coupling the wind turbine system 901 to a top end of the center buoyant column 201, the pontoons may be coupled, installed, or attached to the center buoyant column and/or the outer buoyant columns by welding, bolting, or casting. Welding may comprise continuous or intermittent fillet, partial-joint or full joint penetration welds, or any combination thereof. Bolting may comprise continuous or intermittent flanges, or a plurality of brackets and fittings. Bolting connections may also include polymer sealants and gaskets, or a combination thereof.

Figure 6:
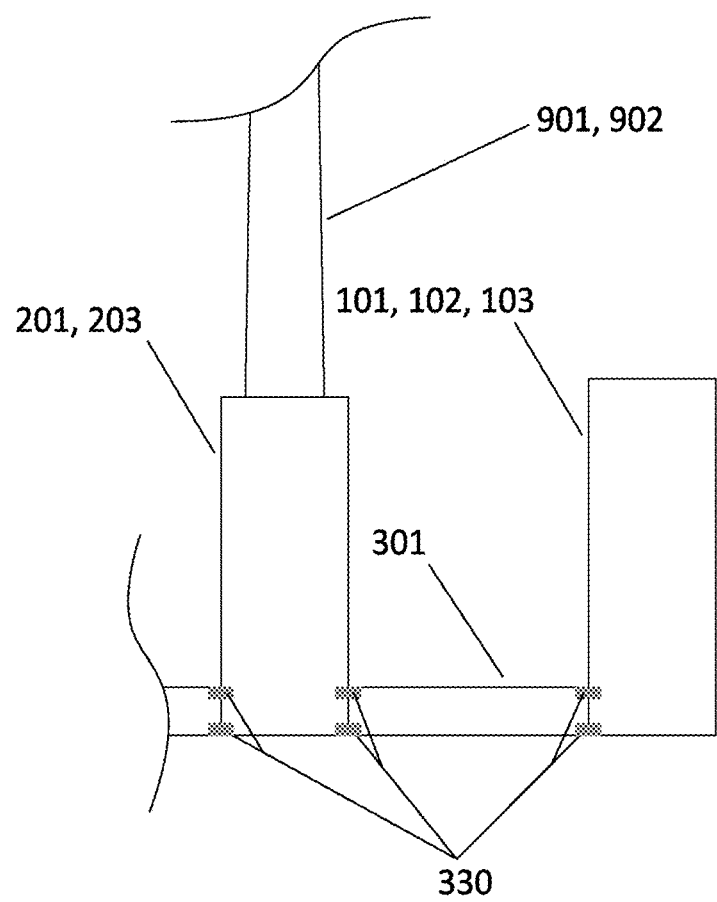
FIG. 6 is an elevation view of a method of coupling pontoons and buoyant columns using castings according to a further embodiment of the disclosure.

With reference to FIG. 6, coupling between the pontoons 301 and the center buoyant column 201 or outer buoyant columns 101 may include castings 330. The castings 330 may comprise a single piece or a plurality of pieces. Castings 330 may comprise a part of the pontoon 301 or a part of the center buoyant columns 201 or a part of the outer buoyant column 101. Coupling of the pontoons 301 to the center buoyant columns 201 or outer buoyant columns 101 using castings 330 may comprise welding or bolting. Welds may comprise continuous or intermittent fillet, partial joint penetration or full joint penetration welds or any combination thereof. Bolting may comprise continuous or intermittent flanges, or a single or plurality of brackets and fittings. Bolted connections may also include polymer sealants and gaskets, or a combination thereof.

Figure 7:
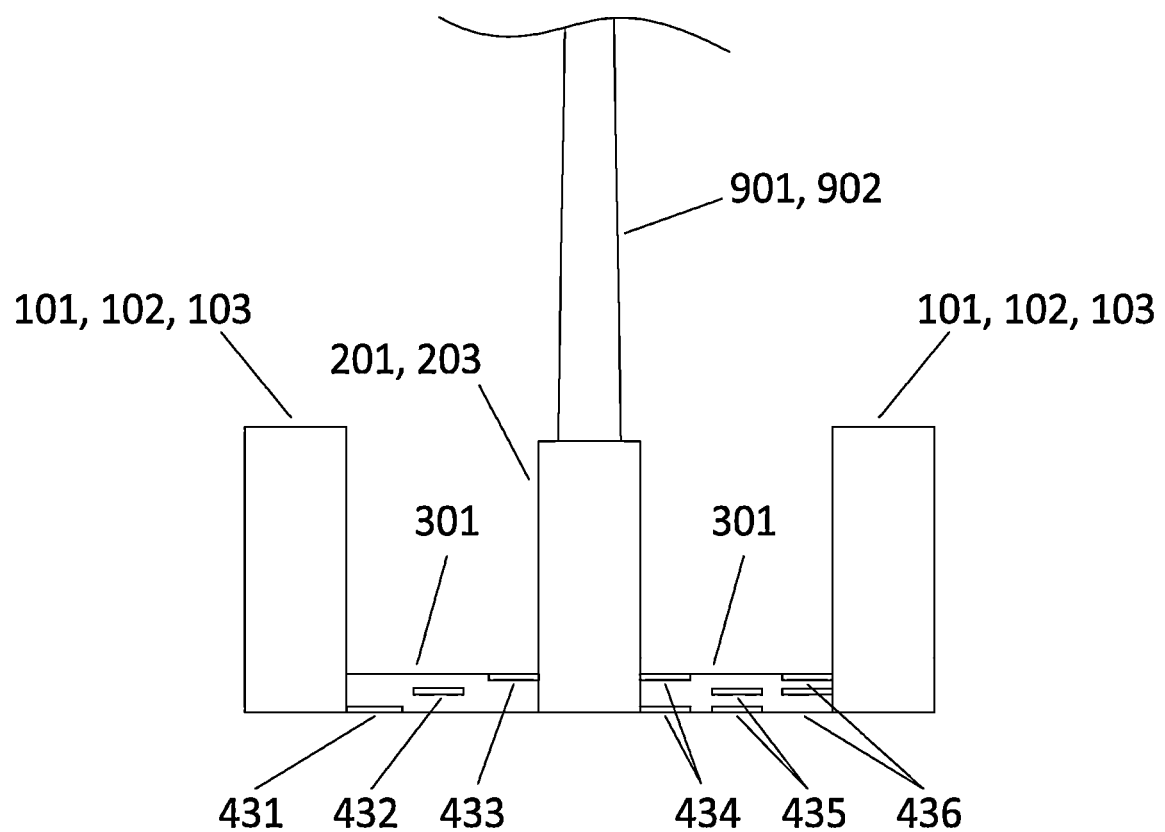
FIG. 7 is an elevation view of a floating foundation with motion attenuating extension arranged at various locations on the sides of the pontoons with single or double layer according to an embodiment of the disclosure.

Referring now to FIG. 7, FIG. 7 illustrates various arrangements of motion attenuating extensions 401, which are structures disposed on the lateral sides of the pontoons 301 to alleviate the rocking movement of the floating foundation. The motion attenuating extensions 401 which may be comprised of steel material, may be arranged horizontally at the bottom 431 of a lateral side of the pontoon 301, at the top 433 of a lateral side of the pontoon 301, or at an elevation in between 432. Motion attenuating extensions 401 may also be arranged on the pontoons 301 in parallel to form a dual or more layers at the top and bottom of the pontoon 434, at the bottom of the pontoon and at an elevation above the bottom of the pontoon 435, or at the top of the bottom and at an elevation below the top of the pontoon 436. Each motion attenuating extension 401 may be arranged continuously from the buoyant center column end of the pontoon to the buoyant outer column end, or intermittently along the longitudinal axis of pontoon 301. The preferred maximum width of the motion attenuating extension 401, as measured from a lateral side edge of the pontoon 301, is 1.5 times the width of the pontoon 301. Coupling of the motion attenuating extensions 401 to the pontoons 301 may be done by welding or bolting. Welding may comprise continuous or intermittent fillet, partial-joint or full joint penetration welds, or any combination thereof. Bolting may comprise direct bolting of the steel motion attenuating extension 401 to the pontoons 301 or may comprise a plurality of brackets and fittings. Bolted connections may also include polymer sealants and gaskets, or a combination thereof.

Figure 8A:
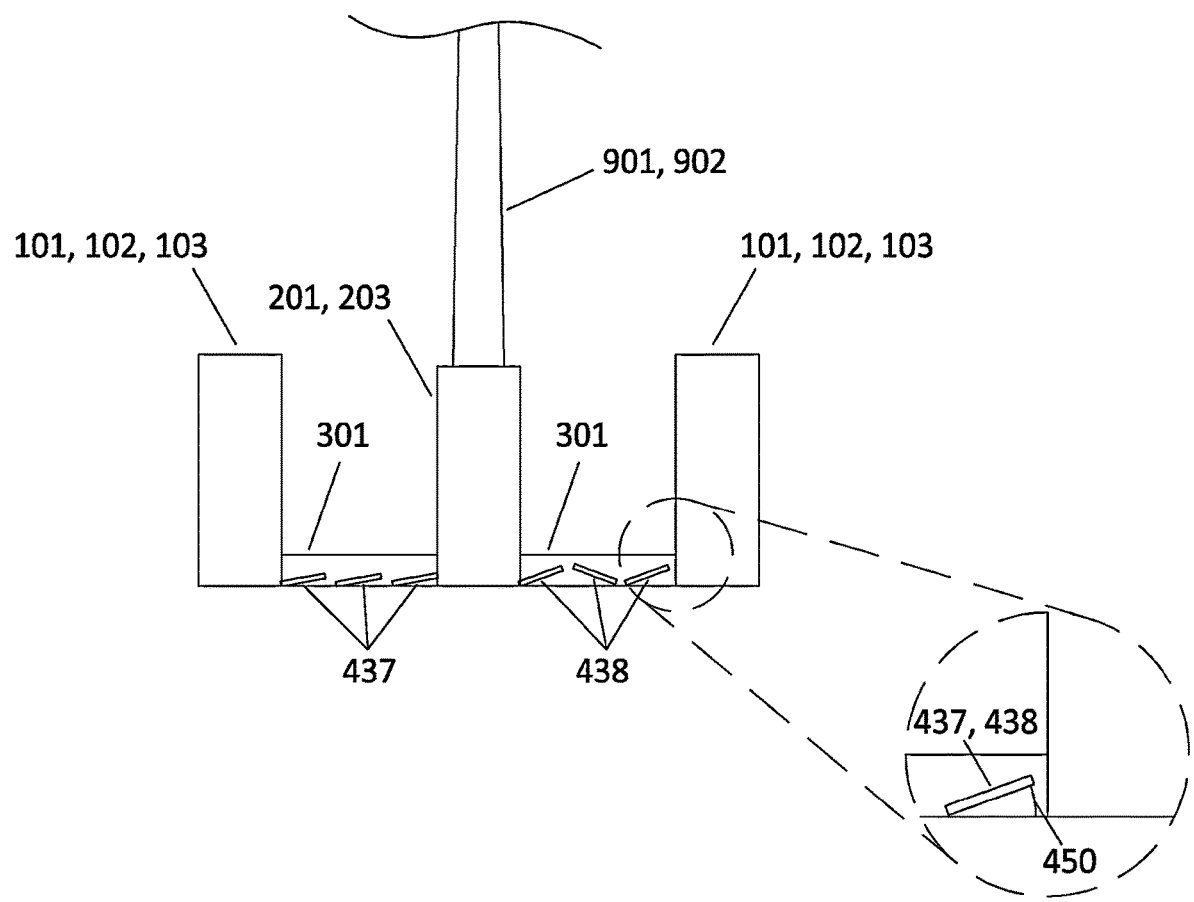
FIG. 8A is an elevation view of a floating foundation with motion attenuating extension arrangements oriented at an angle according to a further embodiment of the disclosure.

In FIG. 8A, another embodiment of the present disclosure shows coupling the motion attenuating extensions 437, 438 to the pontoons 301 at an angle 450 measured from the horizontal plane of the pontoon 301. The angle 450 may be up to 45 degrees from the horizontal plane of the pontoon 301. By attaching the motion attenuating extensions at an angle, the edge length of the motion attenuating extensions increase, which increases vortex shedding and attenuates motions more. Also, an angled arrangement has a larger surface area which allows for adding more total porosity within the motion attenuating extensions. With increased total pore perimeter length for additional vortex shedding, the angled arrangement allows more attenuating platform motion than a horizontally arranged motion attenuating extension.

The motion attenuating extensions 437, 438 may be arranged to partially overlap. Overlapping or doubling of motion attenuating extensions increases the added hydrodynamic mass which can contribute more to attenuating the platform motions compared to a single layer application of motion attenuating extensions.

Figure 8B:
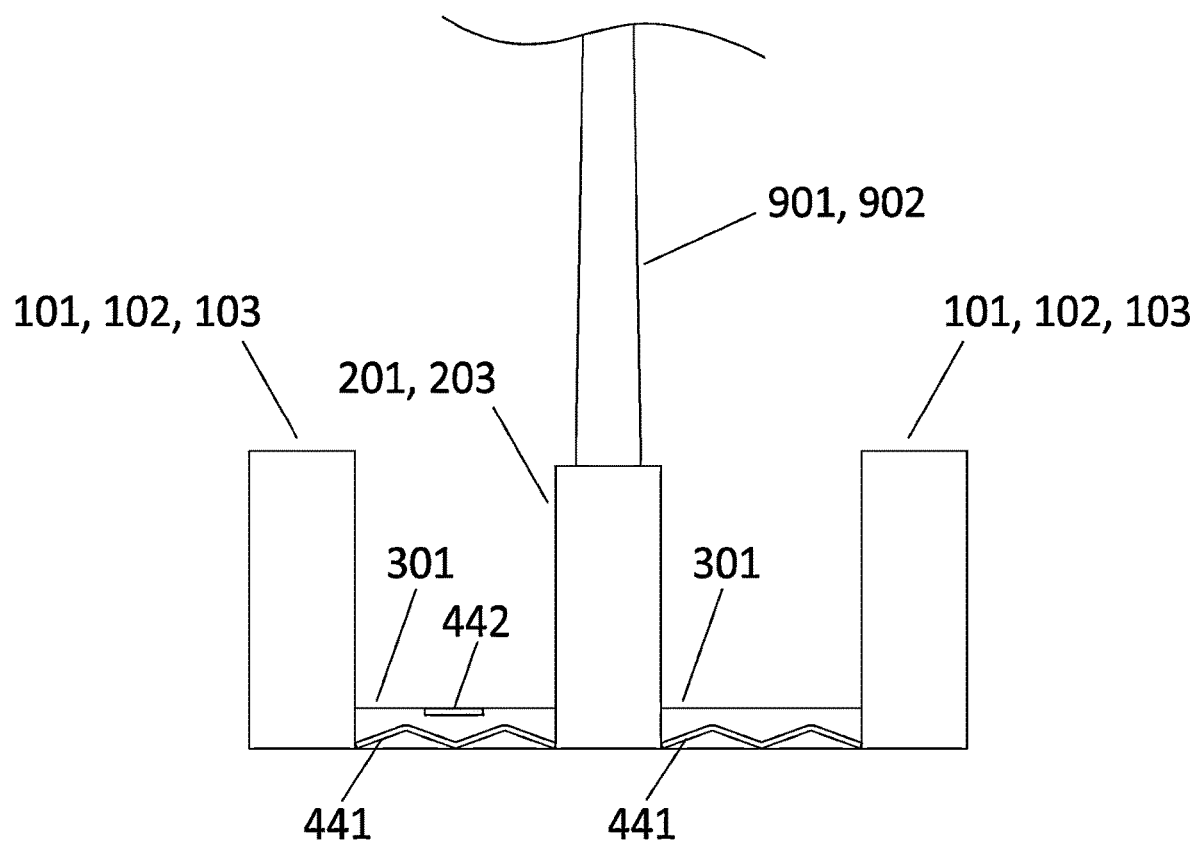
FIG. 8B is an elevation view of a floating foundation with continuous motion attenuating extensions arrangements oriented at an angle according to a further embodiment of the disclosure.

FIG. 8B is another embodiment of the disclosure comprising coupling of continuous motion attenuating extensions 441 at angles up to 45 degrees from the horizontal plane of the pontoon 301. Additionally, intermittent motion attenuating extensions 442 positioned at a distance above the lower extensions 441 may be combined.

There are two significant benefits that arise from the motion attenuating extensions 401 disposed on the pontoons 301.

Figure 9A:
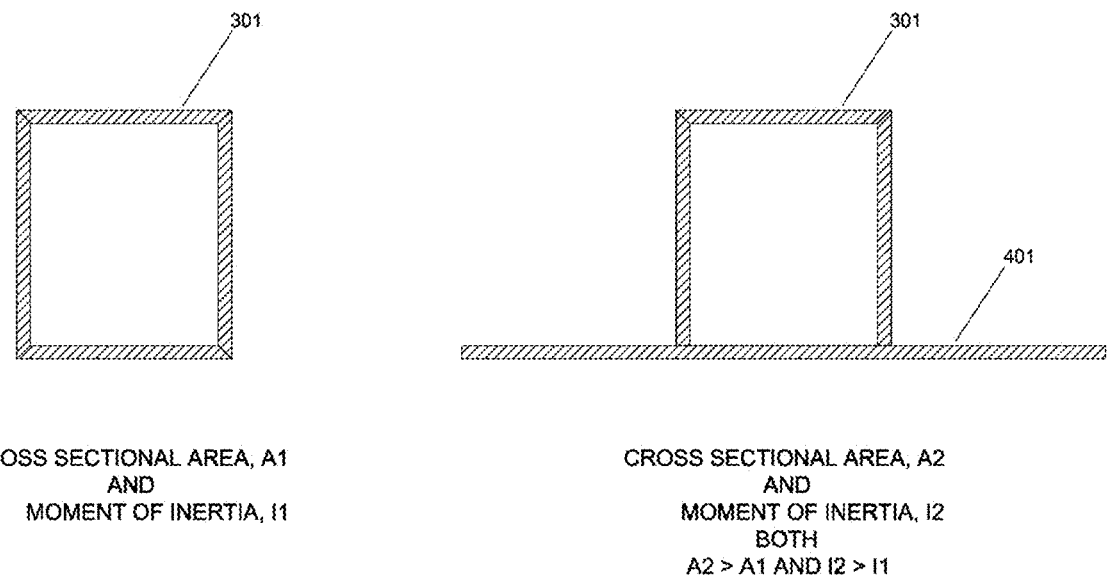
FIG. 9A illustrate cross sectional views showing the increase in cross section area and moment of inertia for a pontoon with motion attenuating extensions attached.

Firstly, referring now to FIG. 9A, the motion attenuating extensions 401 disposed on the lateral sides of pontoons 301 increases the cross section area (A1, A2) and the moment of inertia (I1 and I2) of the pontoons 301 which results in greater structural strength to resist bending loads.

Figure 9B:
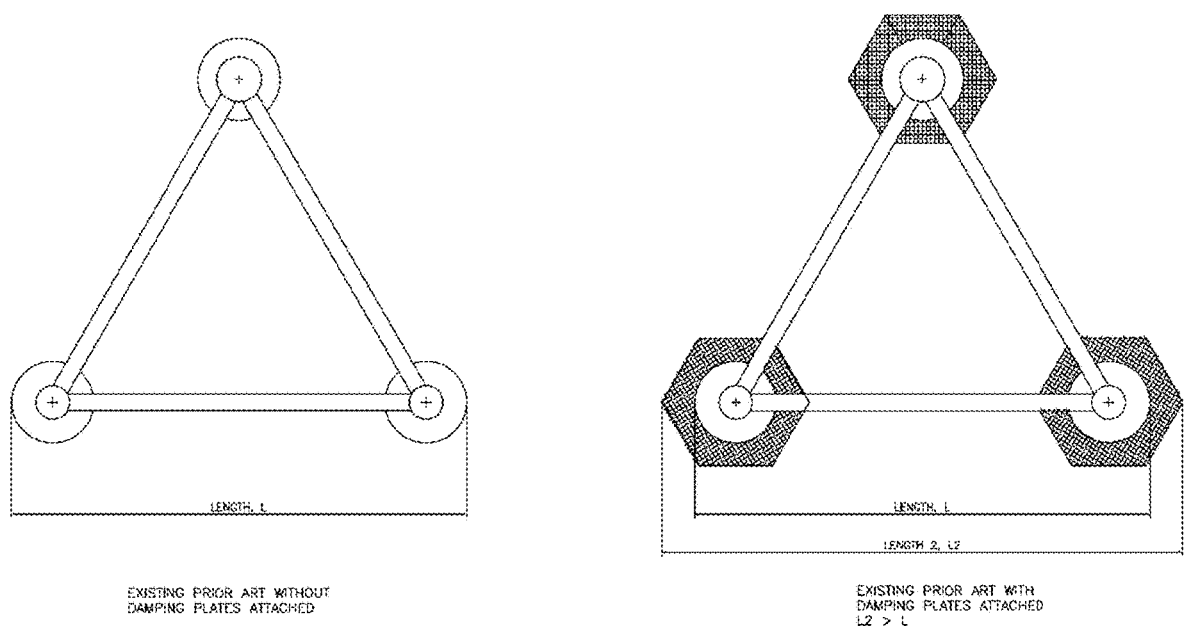
FIG. 9B is a plan view comparing increased structural footprint of a conventional art when damping structures are attached to the bases of the outer buoyant columns.
Figure 9C:
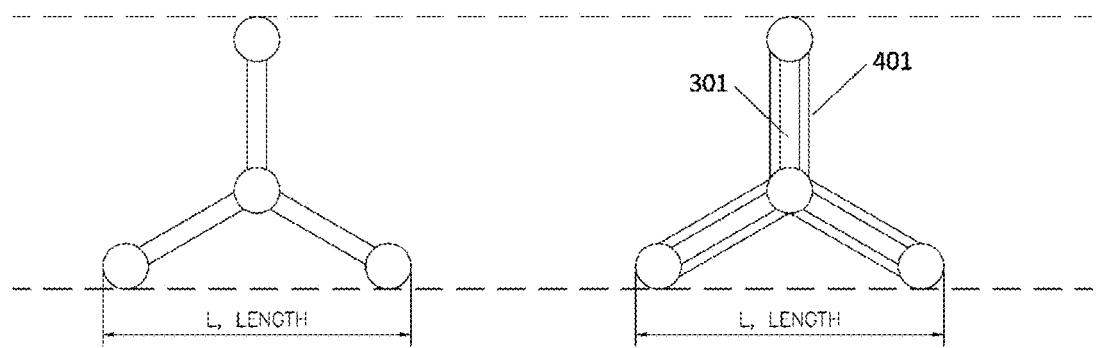
FIG. 9C is a plan view illustrating an advantage of the present disclosure wherein the motion attenuating extensions are attached to the sides of the pontoons such that they do not increase the structural footprint of the floating foundation.

Secondly, the motion attenuating extensions 401 disposed on the lateral sides of pontoons 301 does not increase the geometric footprint of the floating foundation 001. On the other hand, for conventional floating foundations which incorporate damping structures around the base of the buoyant columns, the footprint of the platform is larger than if there were no damping structures (See FIG. 9B). This larger footprint results in larger dry docks or yard areas for fabrication and moves the platform further away from quayside for any turbine integration or maintenance activities, increasing the associated operation risk. For the embodiments of the present disclosure, locating the motion attenuating extensions 401 along the pontoons 301 does not increase the geometric footprint of the platform (See FIG. 9C), which in turn allows for smaller dry docks and yard facilities to be used for fabrication and brings the floating foundation closer to quayside reducing risks associated with turbine integration or maintenance activities.

Figure 10:
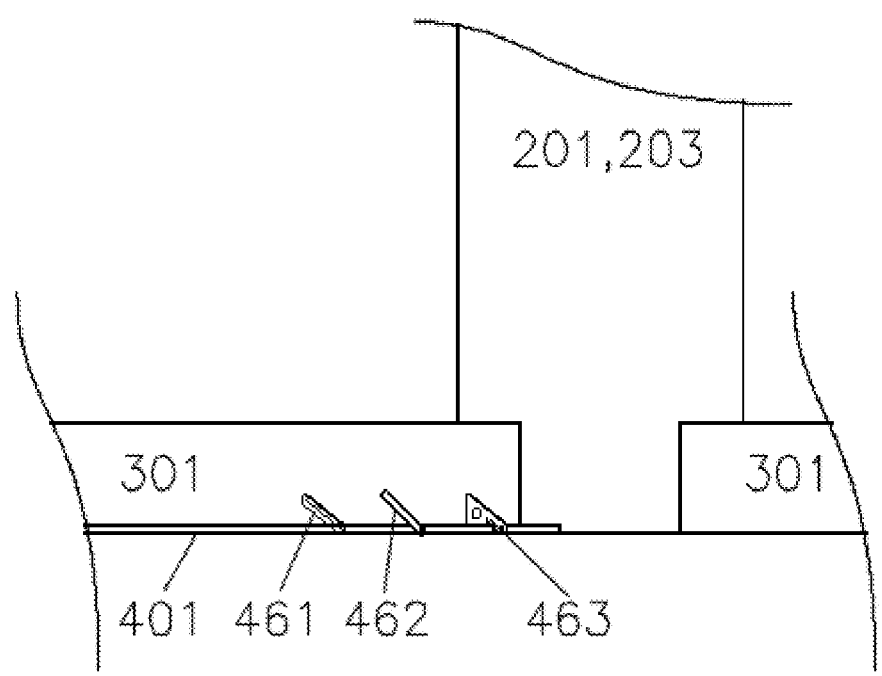
FIG. 10 is an elevation detail view of various types of structural support of the motion attenuating extensions according to a further embodiment of the disclosure.

FIG. 10 illustrates various types of structural supports for the motion attenuating extensions 401. The structural supports may be fabricated steel supports having one or more of structural shapes 461, tubulars 462 or plating 463 or any combination thereof. Coupling of the structural supports 461, 462, 463 to the motion attenuating extensions 401 may be done by welding or bolting. Welding may comprise continuous or intermittent, fillet, partial joint penetration or full joint penetration welds or any combination thereof. Bolting may include direct bolting of the structural supports 461, 462, 463 to the pontoons 301 or may include a plurality of brackets and fittings. Bolted connections may also include polymer sealants and gaskets, or a combination thereof.

Bolting the motion attenuating extensions 401 to the pontoons 301 may be preferred as bolting allows for the replacing of the motion attenuating extensions 401 for several conditions:
  a) when the floating foundation is being moved to a different operating site that requires a different motion attenuating extensions 401 design for that site.
  b) quick maintenance replacement of the motion attenuating extensions 401 or sections of the motion attenuating extensions 401 that may have been damaged.
  c) changing motion attenuating extensions 401 to adjust the attenuating function of the motion attenuating extensions 401 for floating foundation behavior when already deployed at the operating site.

Figure 11A:
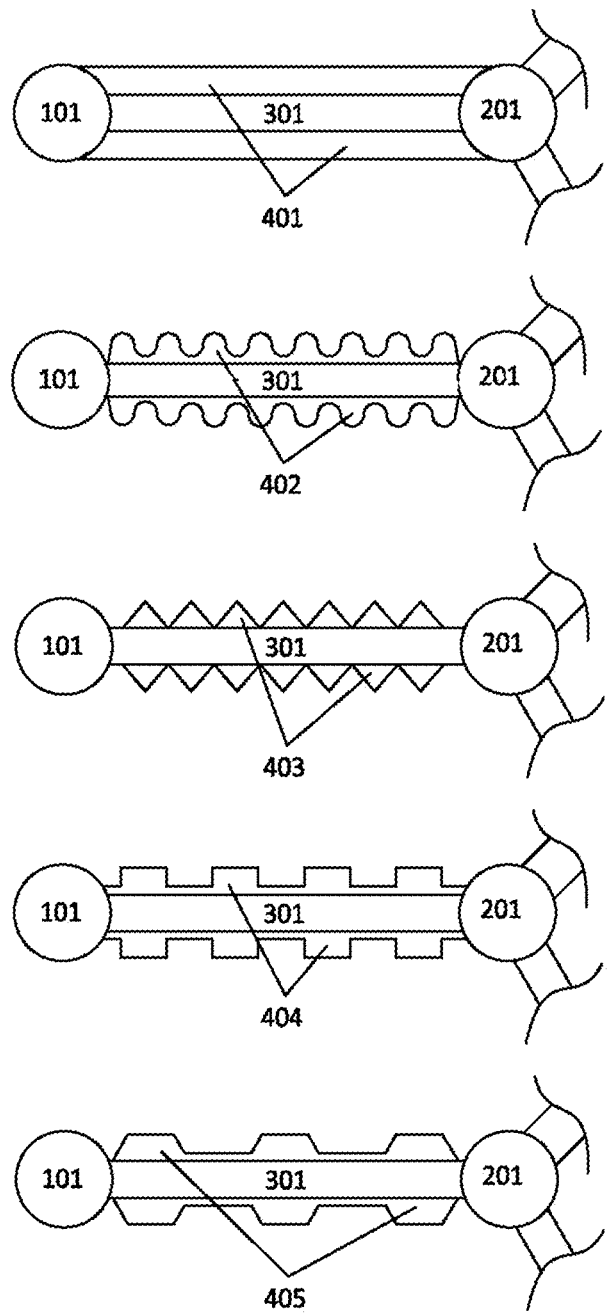
FIG. 11A is a plan view detail of various types of continuous motion attenuating extensions according to a further embodiment of the disclosure.

Referring now to FIG. 11A, FIG. 11A illustrates various example shapes of motion attenuating extensions 401. The motion attenuating extensions may be continuous or intermittent extensions from the one end of the pontoons 301 to the other end. Continuous motion attenuating extensions may include rectangular 401, wave form 402, triangular or sawtooth 403, square step wave 404 or pulse 405 shape forms or any combination thereof. Continuous motion attenuating extensions 401 may comprise any geometric shape or pattern disposed along the lateral sides of the pontoons 301.

Figure 11B:
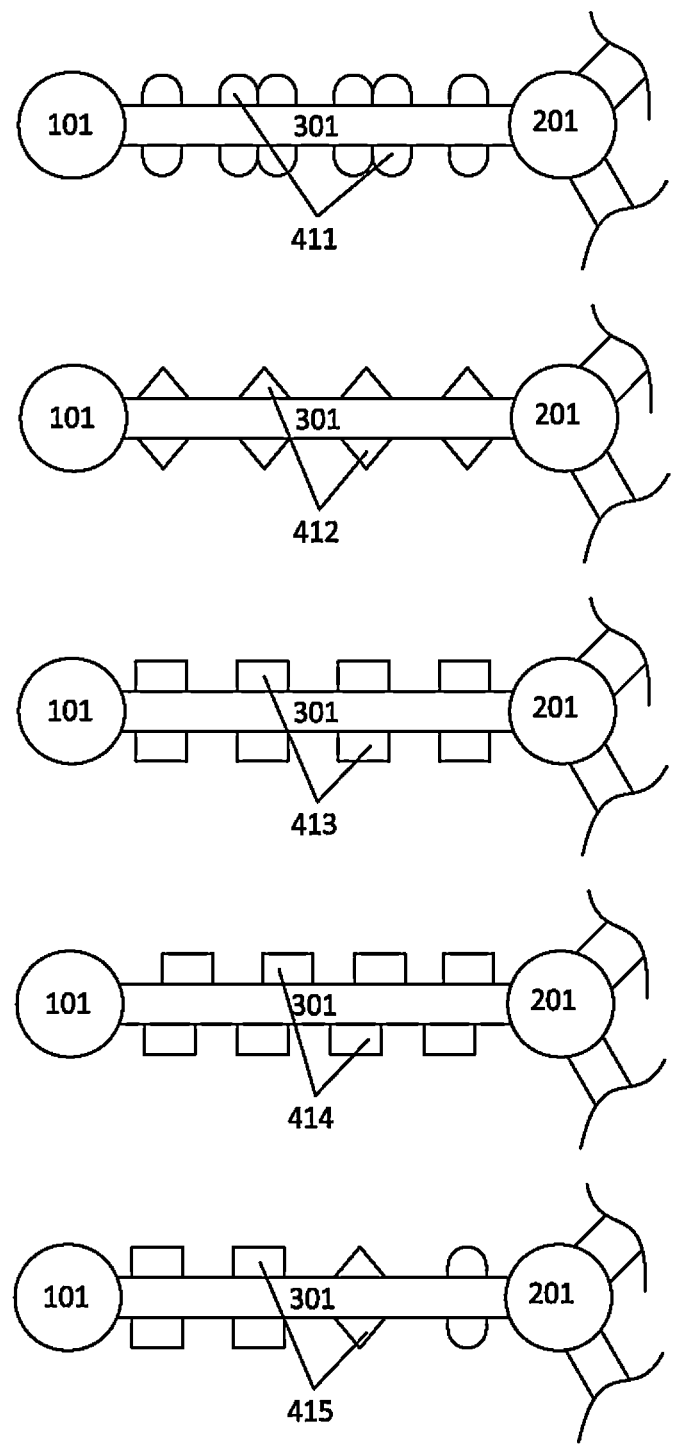
FIG. 11B is a plan view detail of various types of intermittent motion attenuating extensions according to a further embodiment of the disclosure.

In FIG. 11B, other embodiments of the present disclosure showing intermittent motion attenuating extensions 401 are shown. Intermittent motion attenuating extensions may include hemispherical or parabolic shapes 411, triangular shapes 412, square or rectangular shapes 413 or any combination thereof 414 415. Intermittent motion attenuating extension shapes may also include regular or irregular polygonal shapes, symmetric arrangements about the axis of the pontoons 301, or a staggered arrangement about the longitudinal axis of the pontoons 301. An advantage of using intermittent motion attenuating extensions is that less amount of steel will be required and therefore overall fabrication cost will be lower. Thus, the decision to use continuous or intermittent motion attenuating extensions should be determined by site environmental basis for each application.

Figure 12A:
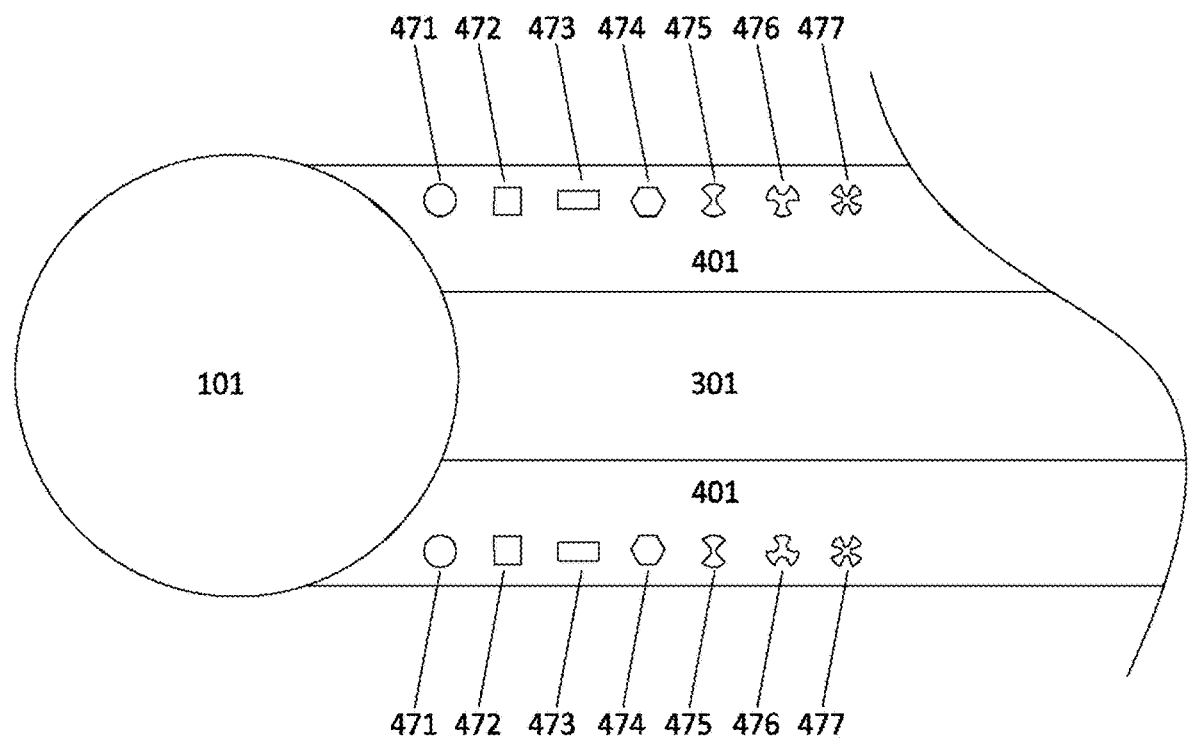
FIG. 12A illustrate various geometrical shapes of pores which may be applied for the motion attenuating extensions according to a further embodiment of the disclosure.

FIG. 12A illustrates yet another embodiment of the present disclosure of the motion attenuating extensions 401 having porosity. The porosity of the motion attenuating extensions may be one or more of circular pores 471, square pores 472, rectangular pores 473, hexagonal or other regular or irregular polygonal pores 474, two-element (or "spoke") pores 475, three element pores 476, four element pores 477 or any combination thereof. Preferred volume ratio of the pores over the whole volume of the motion attenuating extension 401 is greater than 5% but no more than 25%. Porosity greater than 25% will decrease the structural rigidity of the motion attenuating extensions 401.

Pores may be fabricated by shear punching through the motion attenuating extensions 401, by cutting using flame or high pressure liquids, or by inserting prefabricated shapes and fittings into prepared holes on the motion attenuating extensions 401.

Presence of pores in the motion attenuating extensions adds viscous drag, nonlinear damping to the floating foundation. Viscous drag or damping is related to the relative velocity of the platform moving through the fluid and the edge length of the damping structure, i.e. motion attenuating extensions. Thus, by adding pores in the motion attenuating extensions, the overall edge length of the motion attenuating extensions is increased. For individual pores, varying the internal geometry—for example 475, 476, 477 in FIG. 12A—increases the edge length of the pores within their geometric boundary (See FIG. 12C comparing the edge length of a square pore vs. the edge length of a four element pore). Thus, it is possible to realize more viscous damping within the same geometric limits by varying the internal shape of the pore. Similarly, by varying the edge shape (examples shown in 402, 403, 404, 405 in FIG. 11A) of the motion attenuating extensions 401, one can increase the overall edge length to produce greater viscous damping within the same geometric bounds.

Figure 12B:
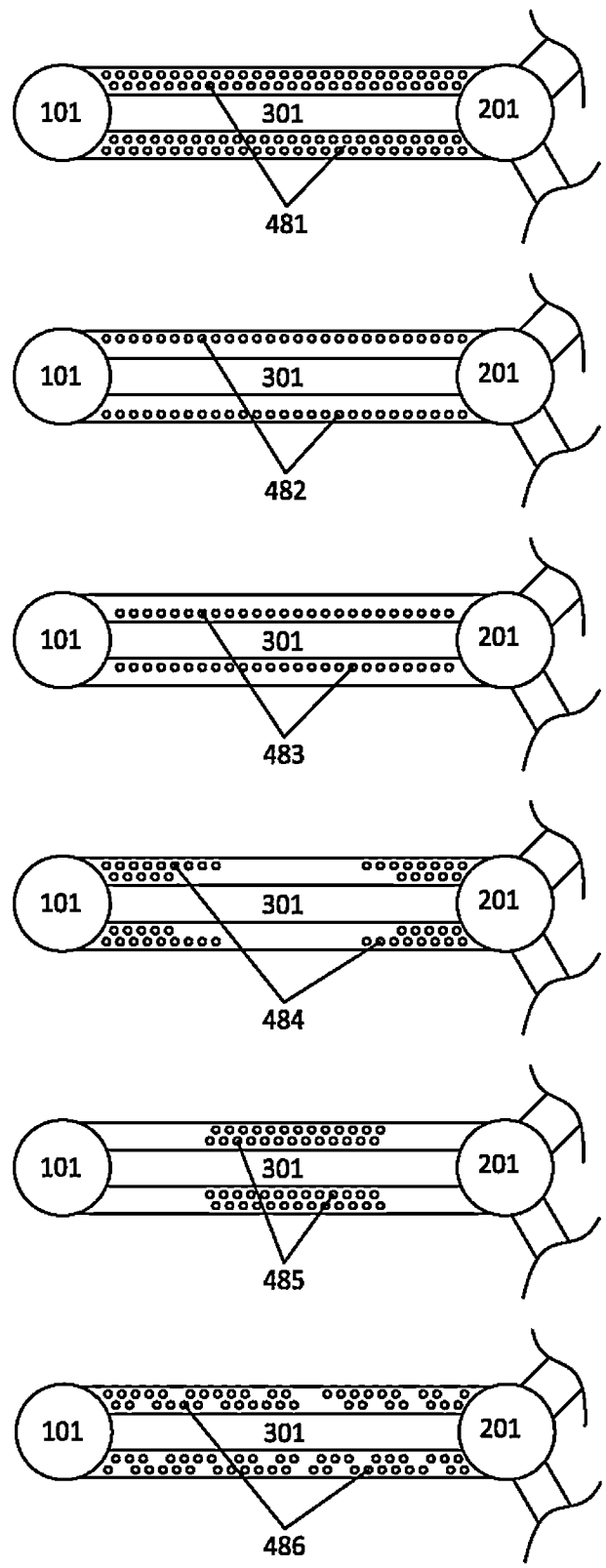
FIG. 12B is a plan view detail of motion attenuating extensions comprising porosity of various distributions according to a further embodiment of the disclosure.
Figure 12C:
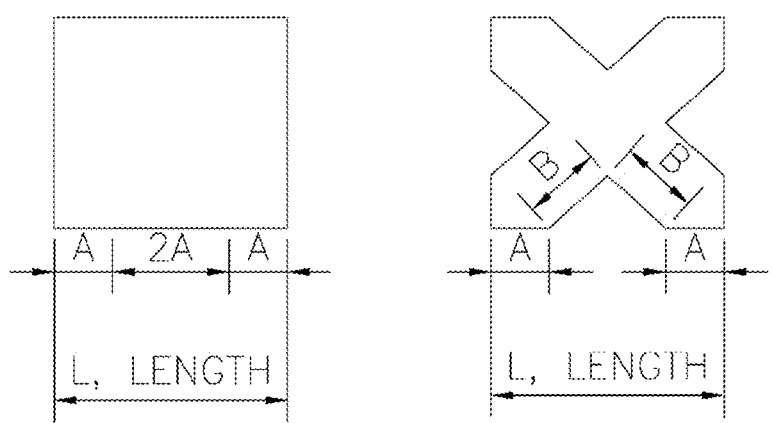
FIG. 12C is a plan view comparing perimeter edge length of a square pore shape vs. perimeter edge length of a four element/spoke pore shape.

FIG. 12B illustrated various exemplary patterns of the distribution of porosity in the motion attenuating extensions

401. The pore distribution may be symmetric, asymmetric or random arrangements. Symmetric arrangements include full distribution 481, concentrated distribution towards the outboard edge 482, concentrated distribution towards the inboard edge 483, concentrated distributions to the ends 484 or concentrated distributions towards the middle 485. Asymmetric or random distributions 486 of porosity are another embodiment of the disclosure.

The motion attenuating extensions 401 coupled to a floating foundation—and preferably coupled to the plurality of pontoons—increases the added mass and added moment of inertia of the floating foundation. During the oscillations of the floating foundation in the water, the part of water mass surrounding the floating foundation is accelerated toward the floating foundation motion directions of heave, roll and pitch. Thus, the accelerated water contributes to increase the dynamic heave mass or roll and pitch moment of inertia of the floating foundation. This results in increasing the natural periods of the heave, roll and pitch away from the wave excitation periods, which leads to motion attenuation, compared to a floating foundation without the motion attenuating extensions.

During the oscillating motions of the semi-submersible floating foundation the motion attenuating extensions 401 cause viscous drags induced by separation of the water from the edges of the continuous or intermittent motion attenuation extensions 401 (exemplary embodiments shown in FIGS. 11A and 11B) and also from the pores in the motion attenuating extensions as shown in exemplary embodiments of FIGS. 12A and 12B. The viscous drags induced by these structural features result in reducing the heave, roll and pitch motions.

Figure 13:
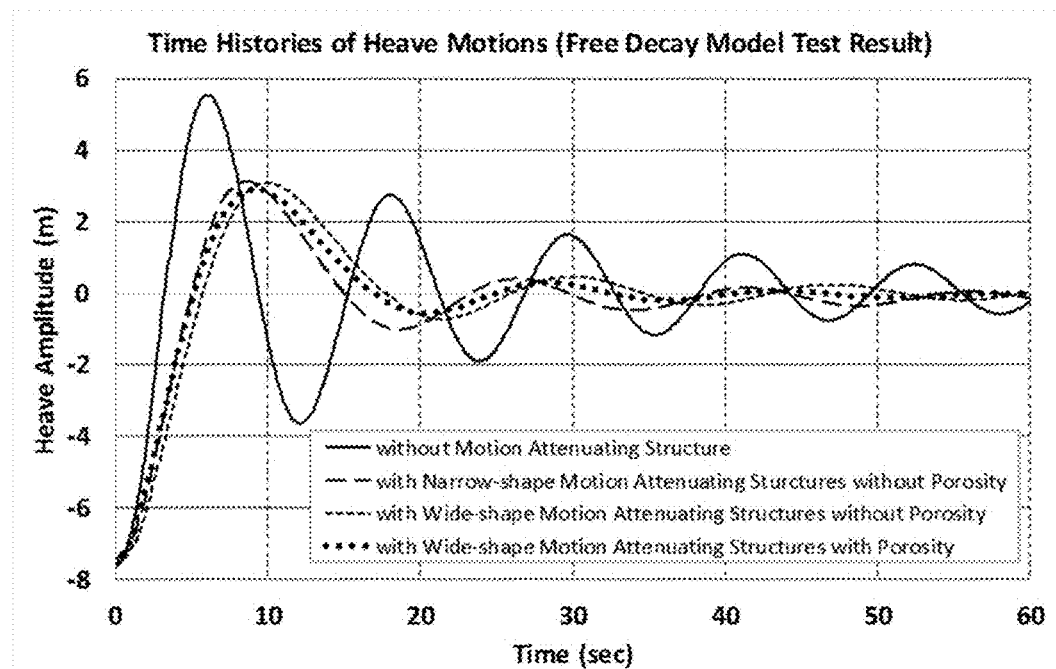
FIG. 13 is a chart comparing heave decay time histories for a floating foundation with and without embodiments of the disclosure.
Figure 14:
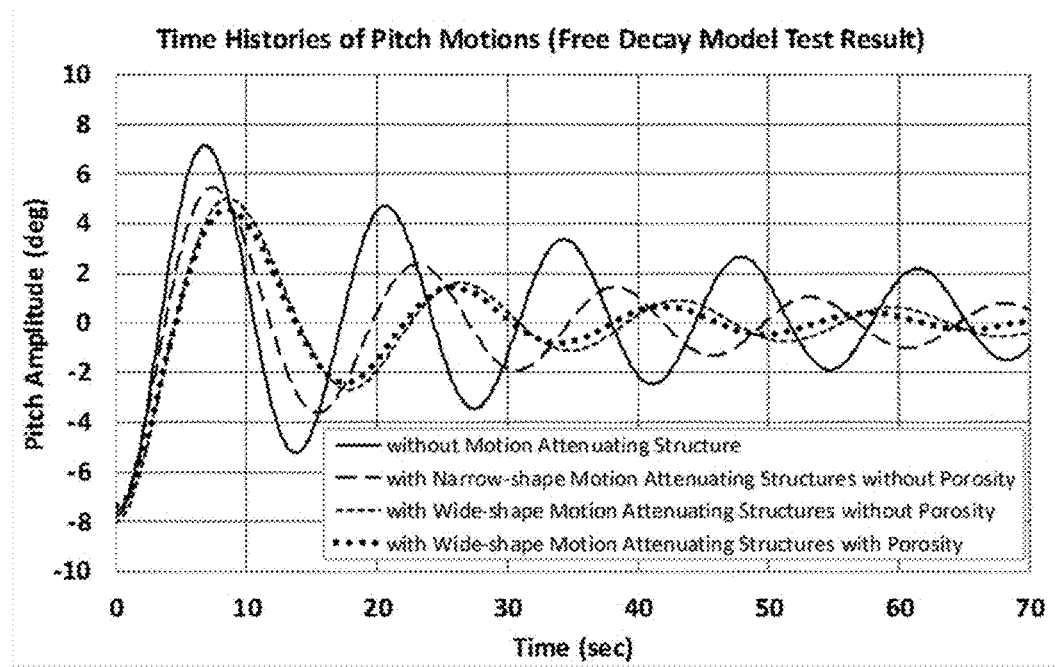
FIG. 14 is a chart comparing pitch decay time histories for a floating foundation with and without embodiments of the disclosure.
Figure 15:
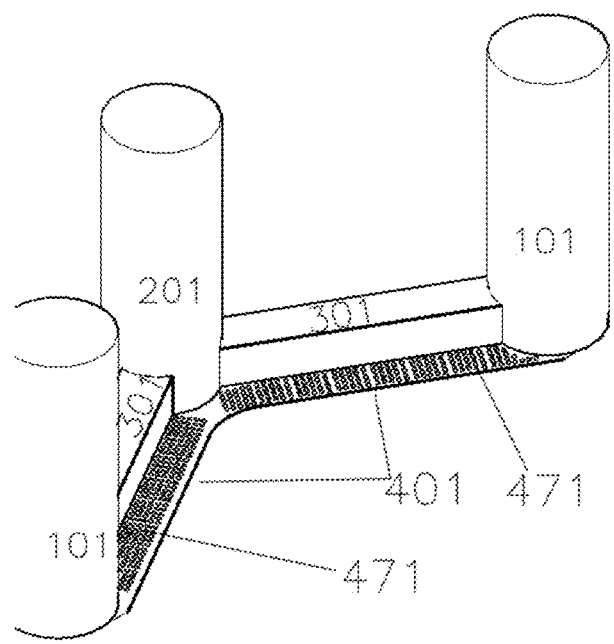
FIG. 15 is a partial view of an embodiment of the present disclosure showing porosity distribution on the motion attenuation extensions during one of the model tests undertaken.

Referring now to FIGS. 13 and 14, FIGS. 13 and 14 compare the heave and pitch free decay time histories, respectively, measured at the wave basin test with a scaled model of a semi-submersible floating foundation for four configurations with different shapes and porosity to assess the performances of the motion attenuating extensions 401: (1) without motion attenuating extensions, (2) with narrow-shape motion attenuating extensions without porosity, (3) with wide-shape motion attenuating extensions without porosity, and (4) with wide-shape motion attenuating extensions with 10% porosity. An exemplary depiction of configuration (4) having wide-shape motion attenuating extensions with roughly 10% porosity is shown in FIG. 15. The test results show higher natural periods and attenuation of the heave and pitch motions with the motion attenuating extensions 401 than the values without the motion attenuating extensions 401. Using these measured data, the heave natural periods and attenuation ratios are summarized in Table 1 below. Significant increase of the natural periods and motion attenuation ratio for both motion attenuating extensions 401 without and with porosity are presented. It is observed that the wide-shape motion attenuation extension configuration generate larger natural period and more motion attenuation than the narrow-shape configuration. The motion attenuation ratios are much more prominent with the motion attenuating extensions with porosity (configuration (4)) than the other three configurations.

TABLE 1

Heave natural period and attenuation ratio comparisons

| Example floating foundation configurations | Heave natural period | Heave attenuation ratio |
|---|---|---|
| Without motion attenuation extensions | 11.5 sec | 6.8% |
| With narrow-shape motion attenuation extensions without porosity | 15.3 sec | 14.2% |
| With wide-shape motion attenuation extensions without porosity | 17.6 sec | 14.5% |
| With wide-shape motion attenuation extensions with porosity | 16.5 sec | 20.5% |

Figure 16:
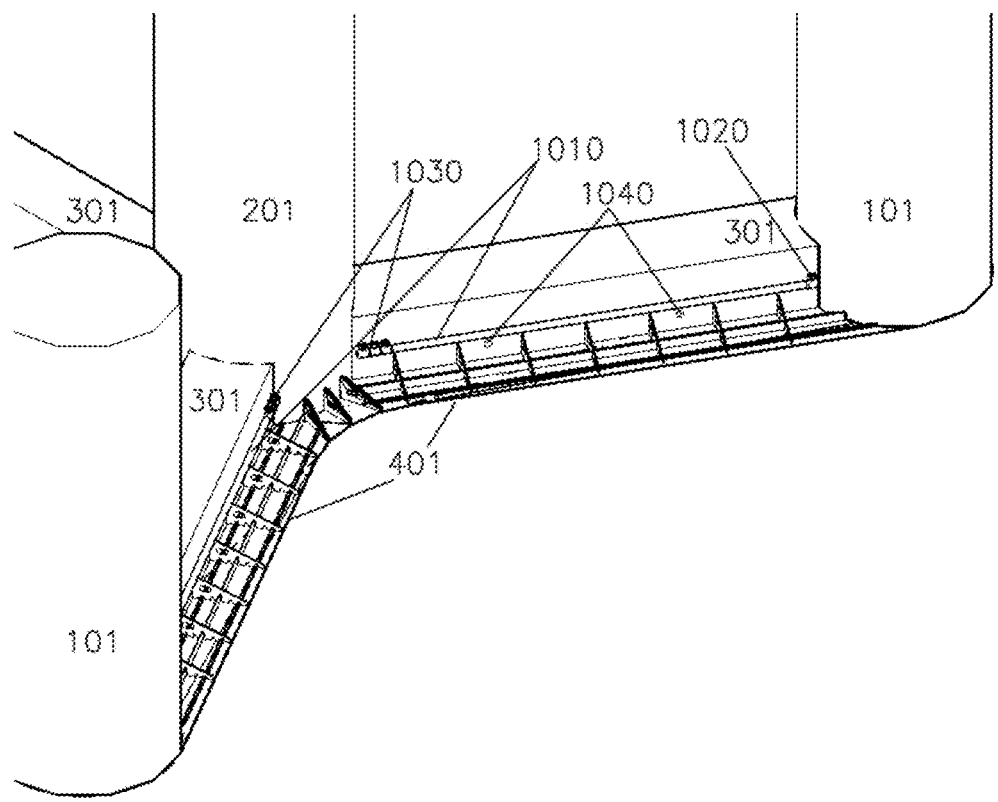
FIG. 16 is an isometric view of an embodiment of the disclosure illustrating a passive ballast system external arrangement and location.

Referring now to FIG. 16, in yet another embodiment of the present disclosure, the semi-submersible floating foundation includes an external ballast system to provide stability to the structure. The external ballast system may comprise pipes 1010, valves 1020, valve assemblies (manifolds) 1030, diaphragms 1040 and fittings (not shown). These external ballast system components are located on the exterior of the pontoons 301, outer columns 101 and center column 201. The buoyancy of the floating foundation can be changed by utilizing the external ballast system and its components to let water into or draw water from inside the ballast compartments of the floating foundation disposed within the buoyant center column, outer columns, and the pontoons. Opening and closing the external valves 1020 connected to the pipes 1010 allows ballast water to flow into the ballast compartments of the floating foundation. To remove ballast water (deballast) from the floating foundation, pumps (not shown) may be connected to the external valves 1020 and fittings to draw water out from inside the floating foundation. Alternatively, pressurized gas lines (including atmospheric air, oxygen or nitrogen) can be attached to external fittings to pressurize and force ballast water out of the ballast compartments through the external valves and fittings. A plurality of external valves and fittings may be connected by a plurality of external pipes and flowlines to facilitate ballasting or deballasting operations to a plurality of compartments within the floating foundation.

The external ballast system valves and fittings may be mechanically operated by Remote Operated Vehicles (ROVs), by remotely actuated systems, manually by divers, or through a plurality of spindles and extensions mounted on the floating foundation above the water line of the floating foundation. Ballast system may include manually operated or remotely operated mechanical, pneumatic or hydraulic valves and fittings arranged individually or in manifolds. Ballast system may further include connection of compressed air lines, flow lines and control cables for valve and ballasting operations. Manual operation of the external ballast system may be from a centralized control location on the outer columns 101 and/or central column 201. For manual operation of the external ballast system, connection of compressed air lines, flow lines or control cables may be located near the manual control location.

The external ballast system may be a passive ballast system, i.e., it is not operational when the wind turbine coupled to the floating foundation is in operation at sea. For a passive ballast system, the ballasting/de-ballasting occurs during deployment to or removal of the floating foundation at the operating site, and while the wind turbine is in operation, the passive ballast system is at rest. Compared to active ballast systems which require pumps and control systems that operate concurrently with the wind turbine, the cost of manufacturing and maintaining passive ballast systems are significantly less over the lifetime of the floating foundation and there is less risk of failure/downtime.

By installing an external ballast system (FIG. 16), several benefits are achieved:
a) less expensive to fabricate as the ballast system lines and components do not need to penetrate internal structural components;
b) reduces the number of total structural penetrations to just those at the shell boundary of the floating foundation;
c) allows more design freedom to locate and position the ballast system components;
d) allows for safer and easier external inspection of the ballast, including by remotely operated vehicles while the foundation is in operation offshore; and
e) allows for energizing of valves and actuators by remote stabbing of power using a remotely operated vehicle.

Figure 17:
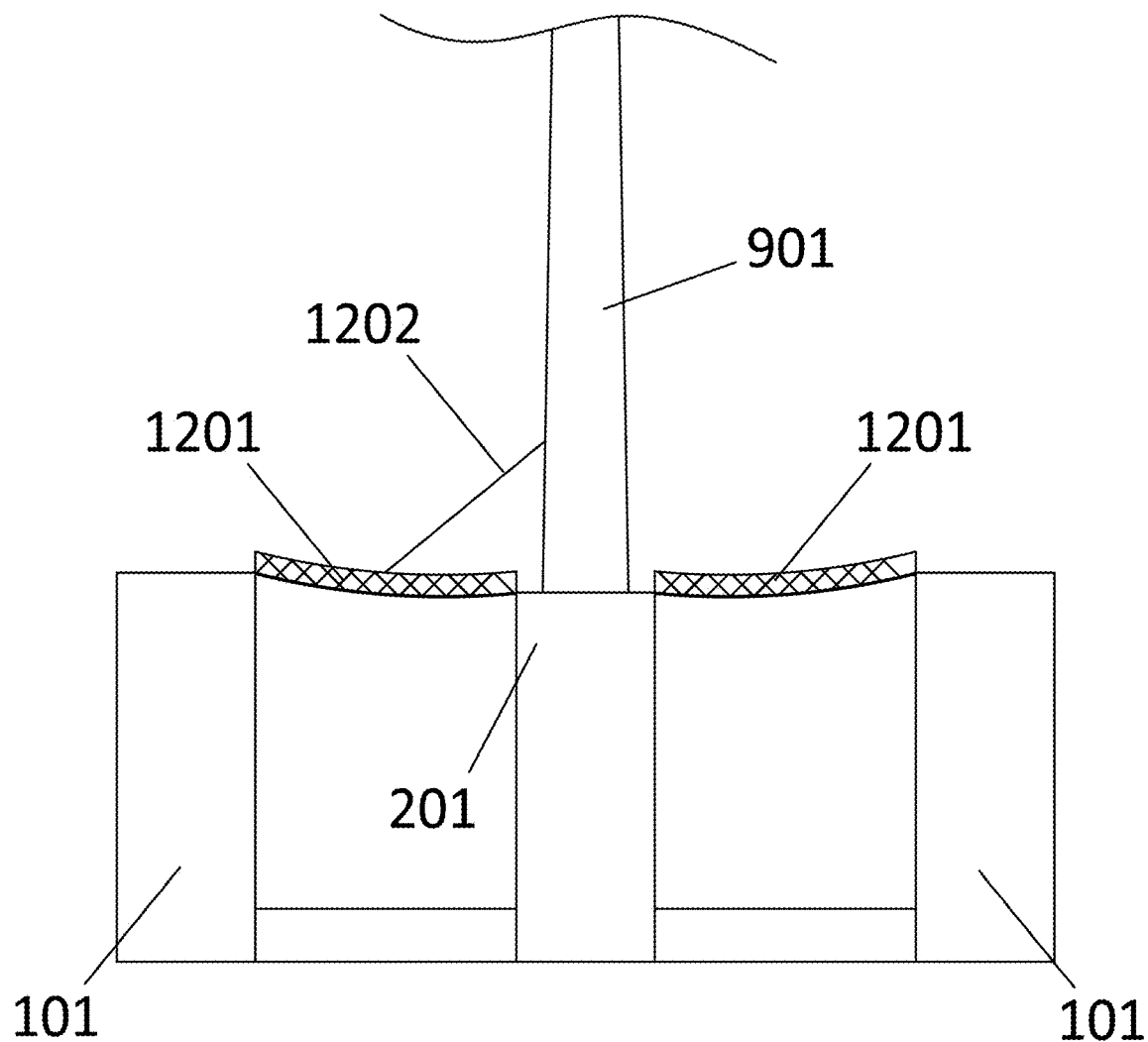
FIG. 17 is an elevation view of a floating foundation showing an embodiment of the present disclosure having a flexible suspended pathway.

For personnel access between manual control stations located in the floating foundation or between columns, a flexible suspended pathway 1201 can be provided (FIG. 17). The flexible suspended pathway is comprised of steel or synthetic rope or a combination thereof. The suspended pathway is provided with suspension cable, handrails and deck. A suspension support line 1202 may also be used to support the suspended pathway 1201.

Figure 18:
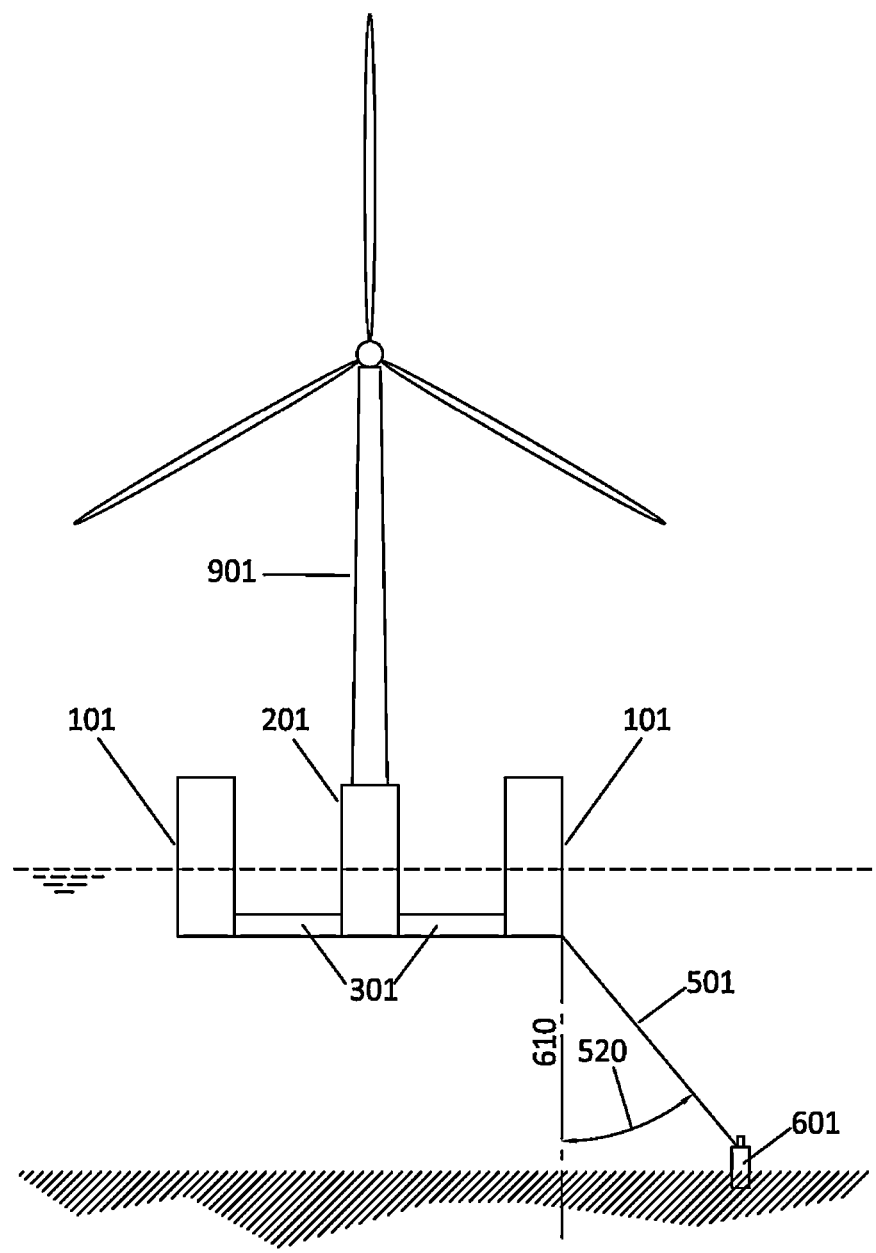
FIG. 18 is an elevation view of a floating foundation with a station keeping system.

With reference to FIG. 2A and FIG. 18, the floating foundation of the present disclosure is equipped with a station keeping system in deep water, which comprises one or more semi-taut or taut mooring lines 501 and one or more seabed anchors 601. The mooring line 501 limits the floating foundation's horizontal excursions during operation. It is preferred that the mooring line 501 at the seabed anchor does not touch the seabed when the floating foundation is at an equilibrium position and the mooring line 501 is in a taut position, i.e., when there are no environmental forces acting on the floating foundation 001. A part of the mooring line 501 adjacent the seabed anchor 601 may touch the seabed at the equilibrium position when the mooring line 501 is in a semi-taut position, without the environmental effects. The station keeping system may also comprise an apparatus for releasing or reeling in the mooring line 501, such as a winch (not shown).

The mooring line 501 of the station keeping system may comprise wire, polyester or synthetic fiber (polymer) lines or chains along with fittings, and any combination thereof. In an embodiment of the present disclosure, the floating foundation 001 and/or the station keeping system comprises fittings, tools and structures to allow for disconnecting and reconnecting the mooring lines 501 from the floating foundation while the floating foundation is installed in a service location, i.e. in operation, or at any transit position between quayside and installed service location. The mooring line 501 also include fittings for mooring line disconnection and reconnection at the seabed anchor 601. Seabed anchors may include, but are not limited to, suction piles or driven piles.

Mooring lines 501 may be coupled to a floating foundation 001 at the outer buoyant columns 101, the center buoyant column 201, or the pontoons 301 at one end and to the seabed anchors 601 at the other end. Preferably, each mooring line 501 is connected near the keel of an outer buoyant column 101 with a pre-tension to configure a taut or semi-taught mooring line at a departure angle 520. The departure angle is measured from a vertical line 610 extending downward from the keel of the floating foundation structure to with the mooring line is attached.

Figure 19:
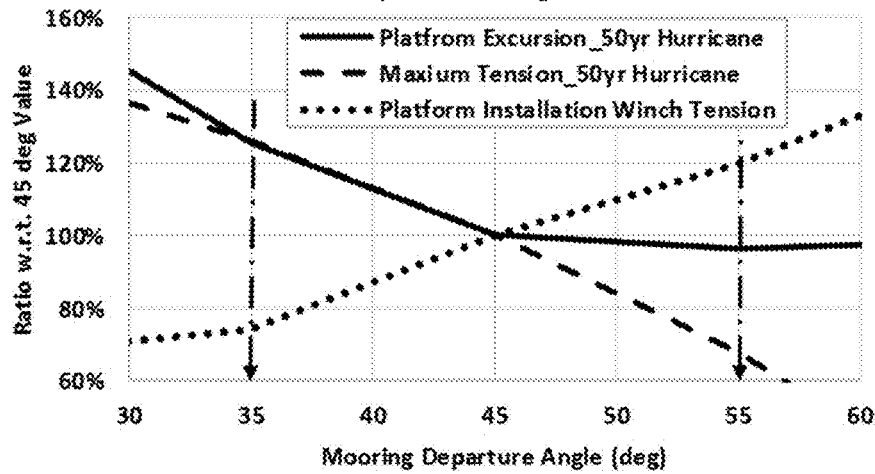
FIG. 19 is a graph indicating the variations of platform excursion, mooring line tensions due to mooring line departure angle.
Figure 20:
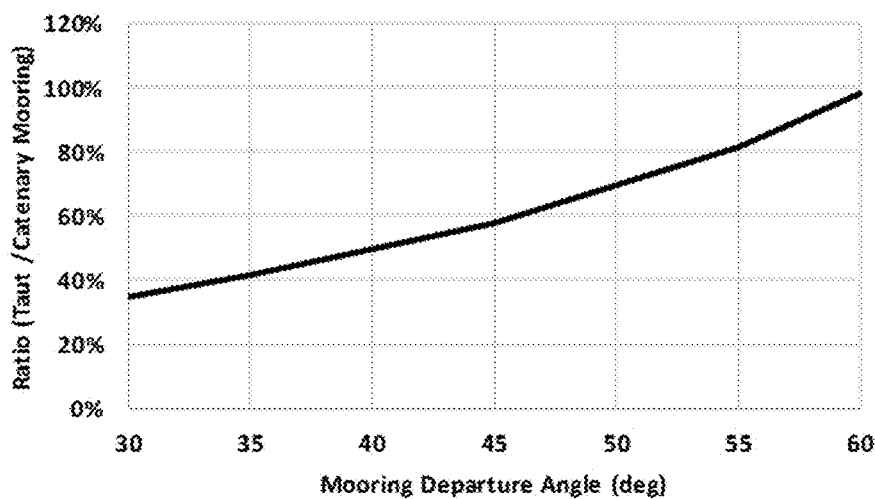
FIG. 20 is a graph showing the mooring foot print ratio (taut/catenary mooring anchor location) due to mooring line departure angle.

FIG. 19 presents the variations of floating foundation excursion, mooring line tensions due to mooring line departure angle, for a case of a floating foundation with a 5 MW turbine moored at a water depth of 800 m with a taut mooring configuration. FIG. 20 shows mooring foot print ratios of taut to catenary anchor location due to the mooring departure angle. Each value was normalized compared to the respective value of 45 degrees.

As evident from FIGS. 19 and 20, dynamic tensions induced by 50 year hurricane decrease with higher departure angle (FIG. 19) but the mooring foot prints for the angle greater than 55 degrees are close to the catenary mooring (FIG. 20) so that taut mooring line with an angle greater than 55 degrees has no advantage in terms of offshore space utilization.

Platform installation winch tensions increase linearly but winch pull-in capacities do not vary linearly across all commercially available winch models. Very often, winches will jump in model size (weight, cost, performance) in 20% or 25% increments. An upper bound mooring line departure angle of 55 degrees corresponds approximately to a 120% increase in mooring load, which is roughly similar to the size incremental boundary for winch models. When mooring line departure angle exceeds 55 degrees, then it is very likely that a larger capacity mooring winch with its associated higher weight and cost will be required.

Additionally, there is a steep increase of platform excursions by 50 year hurricane below the angle of 35 degrees. This results in potential risk on the power cable design (further discussed below). In order to optimize excursion, winch tension and dynamic tension, the preferred mooring line departure angle 520 is between 35 and 55 degrees when measured from the vertical line 610.

Figure 21A:
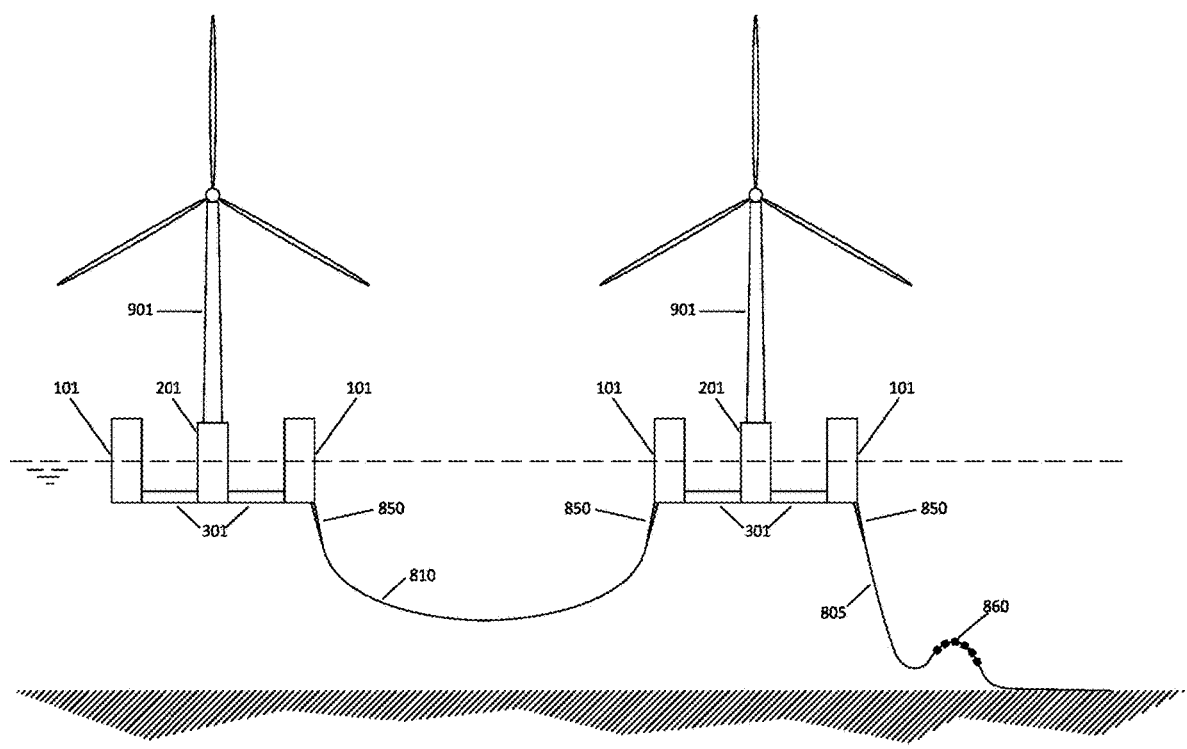
FIG. 21A is an elevation view illustrating neighboring floating foundations with a free hanging inter-array power cable and a single supported arch export power cable according to an embodiment of the disclosure.

Referring now to FIG. 21A, an embodiment of the present disclosure includes inter-array power cable 810 and export power cable 805 for transferring power between a plurality of neighboring floating foundation structures or to an onshore/offshore station, respectively. A single inter-array power cable 810 includes a free hanging power cable in the water column whereas export power cable 805 is configured for a single arch-shaped cable supported by buoyant modules 860 in the water column. The inter-array cable length is determined based on a variety of factors, including the required distance between the neighboring floating foundations, weight/tension of the inter-array power cable, and the desired depth of cable floatation such that the cable is suspended at a predetermined depth in the water column. Each end of the inter-array power cable 810 includes an end termination 850 which comprise power cable end connections, fittings and/or bend stiffeners to couple the inter-array power cable to the floating foundations.

Figure 21B:
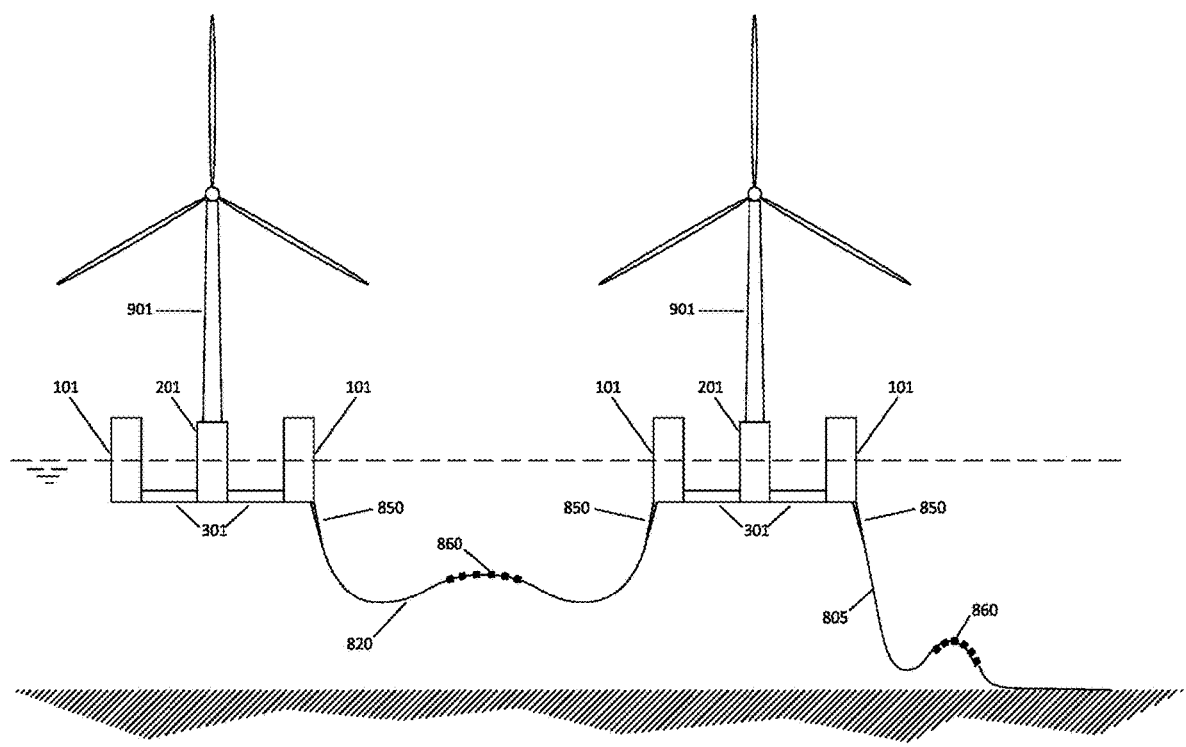
FIG. 21B is an elevation view comprising neighboring floating foundations with a single arch supported inter-array power cable and a single arch supported export power cable according to an embodiment of the disclosure.

FIG. 21B illustrates another embodiment of the disclosure of a single inter-array power cable 820 that may be supported by buoyant modules 860 comprising a single arch shaped cable in the water column. The inter-array cable length with the single arch is determined such that the cable is suspended at a depth in the water column. In FIG. 21B, the export power cable 805 is also configured for a single arch-shaped cable supported by buoyant modules 860 in the water column.

Figure 21C:
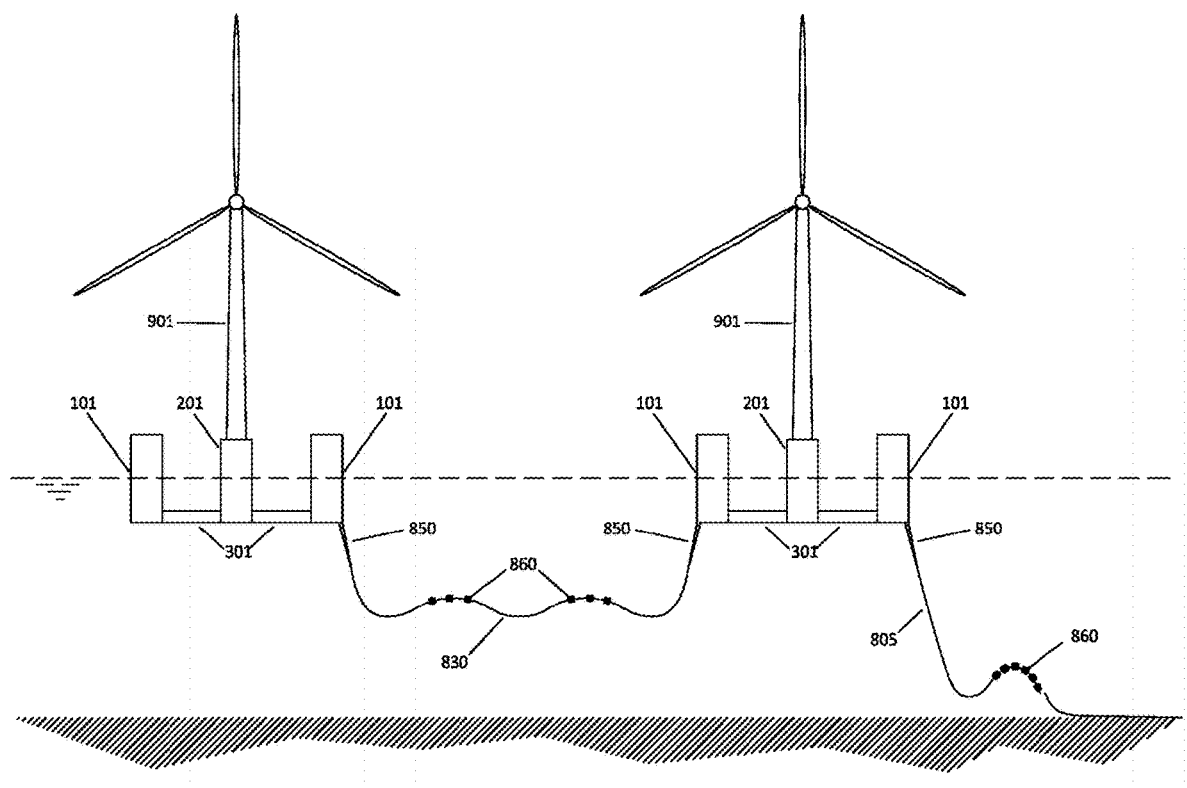
FIG. 21C is an elevation view comprising neighboring floating foundations with a plurality of arches supporting an inter-array power cable and a single arch supported export power cable according to an embodiment of the disclosure.

FIG. 21C illustrates embodiment of the disclosure of single inter-array power cables 830 that may be supported by buoyant modules 860 comprising a plurality of arches in the water column. The inter-array cable length with the plurality of arches is determined such that the cable is suspended at a depth in the water column. In FIG. 21C, the export power cable 805 is also configured for a single arch-shaped cable supported by buoyant modules 860 in the water column.

Figure 22A:
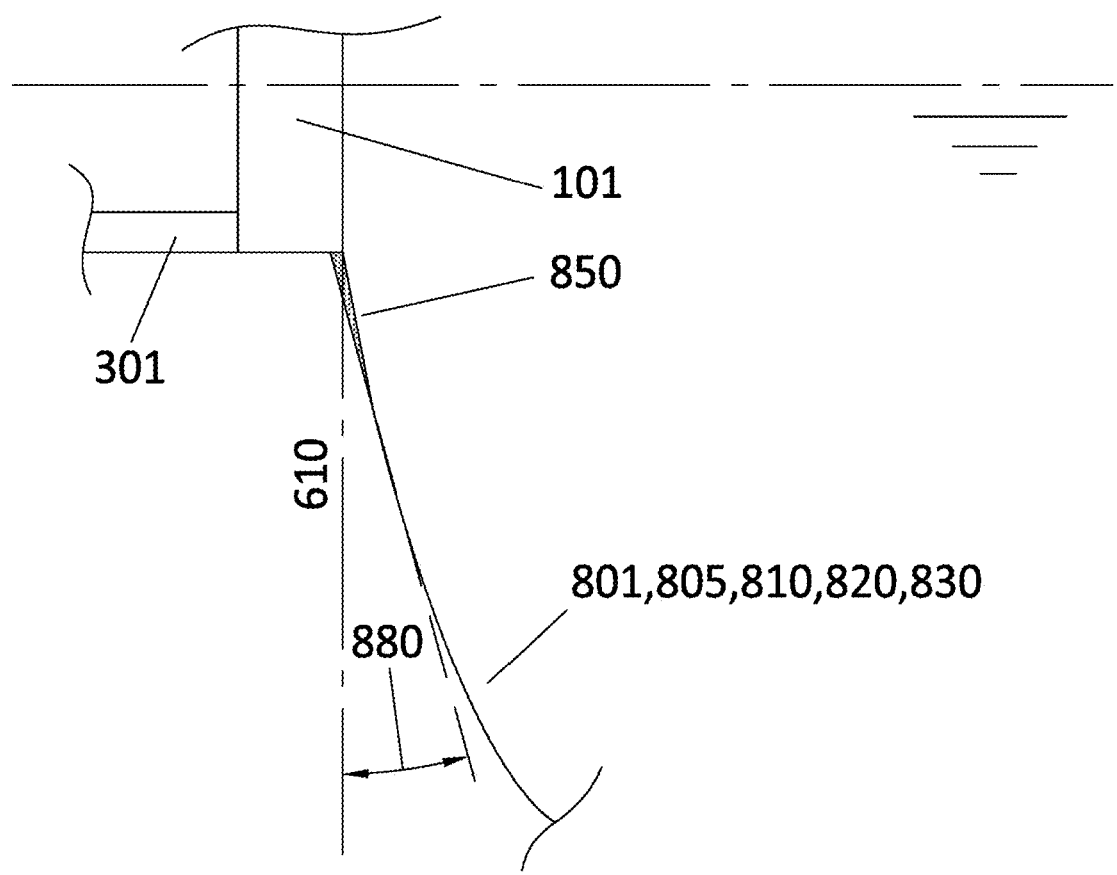
FIG. 22A is an elevation detail view showing a hang-off angle of inter-array or export power cables coupled to the floating foundation according to an embodiment of the disclosure.

FIG. 22A illustrates a hang-off angle 880 of export power cable 805 or inter-array power cable 810, 820, and 830 at the top end the cable coupled to the floating foundation. Hang-off angle 880 of the export power cable 805 may range from 3 to 20 degrees measured from the vertical line 610.

Figure 22B:
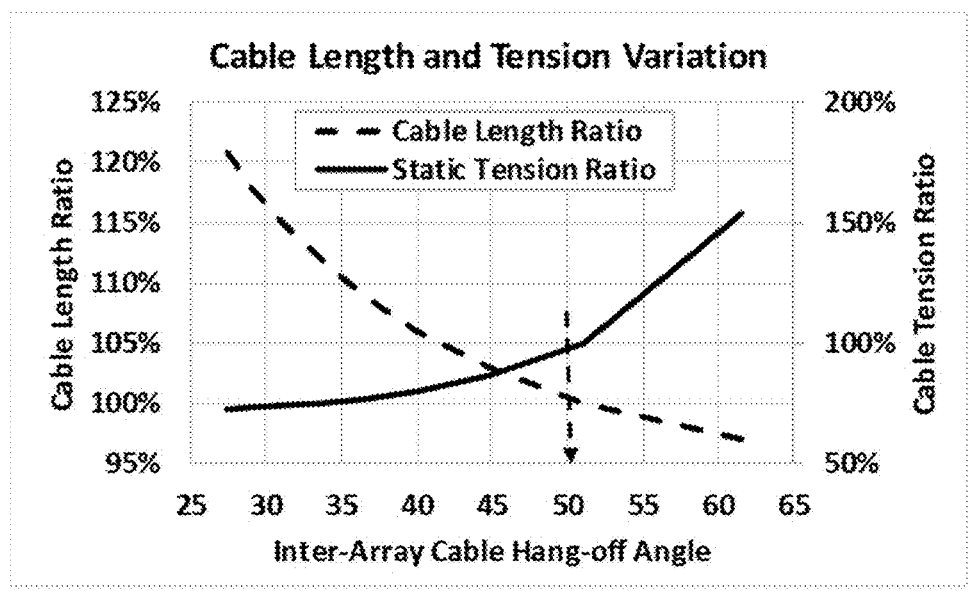
FIG. 22B is a graph showing the inter-array power cable length and static tension due to the cable hang-off angle.

FIG. 22B illustrates variations of the inter-array cable length and static tension depending on the cable hang-off angle 880. For the embodiment measured for FIG. 22B, the cable is configured with a single arch created by the buoyant modules 860. The cable length ratios are values divided by a required minimum inter-array cable length, i.e. the spacing between the connected floating foundations, plus 10% of the water depth to avoid cable damage due to potential high excursions of the floating foundations during a storm. The tension ratios are values of the tension of the end terminations 850 of the inter-array cable with associated hang-off angle 880 to the tension of the minimum length cable. For the case of a 5 MW foundation moored in 800 m water depth, the required spacing of the foundations moored with a taut mooring line is 10 times the rotor diameter of the 5 MW wind turbine.

As seen in FIG. 22B, at 50 degrees of the hang-off angle, the cable length is about the same as the minimum required cable length. As the hang-off angle decreases, the cable length ratios increase, requiring more cable and thus more cable cost. As the hang-off angle decreases, the cable tension ratio also decreases until there is almost no change below 30 degrees of the hang-off angle. However, as the hang-off angle increases, the cable length ratios decrease, but the cable tension ratios increase significantly, which in turn requires high strength performance cable to prevent cable damage. Higher strength cables tend to be higher cost. Therefore, the hang-off angle 880 of the inter-array cable is preferred to be less than 50 degrees. More preferably, the hang off angle 880 is less than 50 degrees and more than 30 degrees.

Figure 23A:
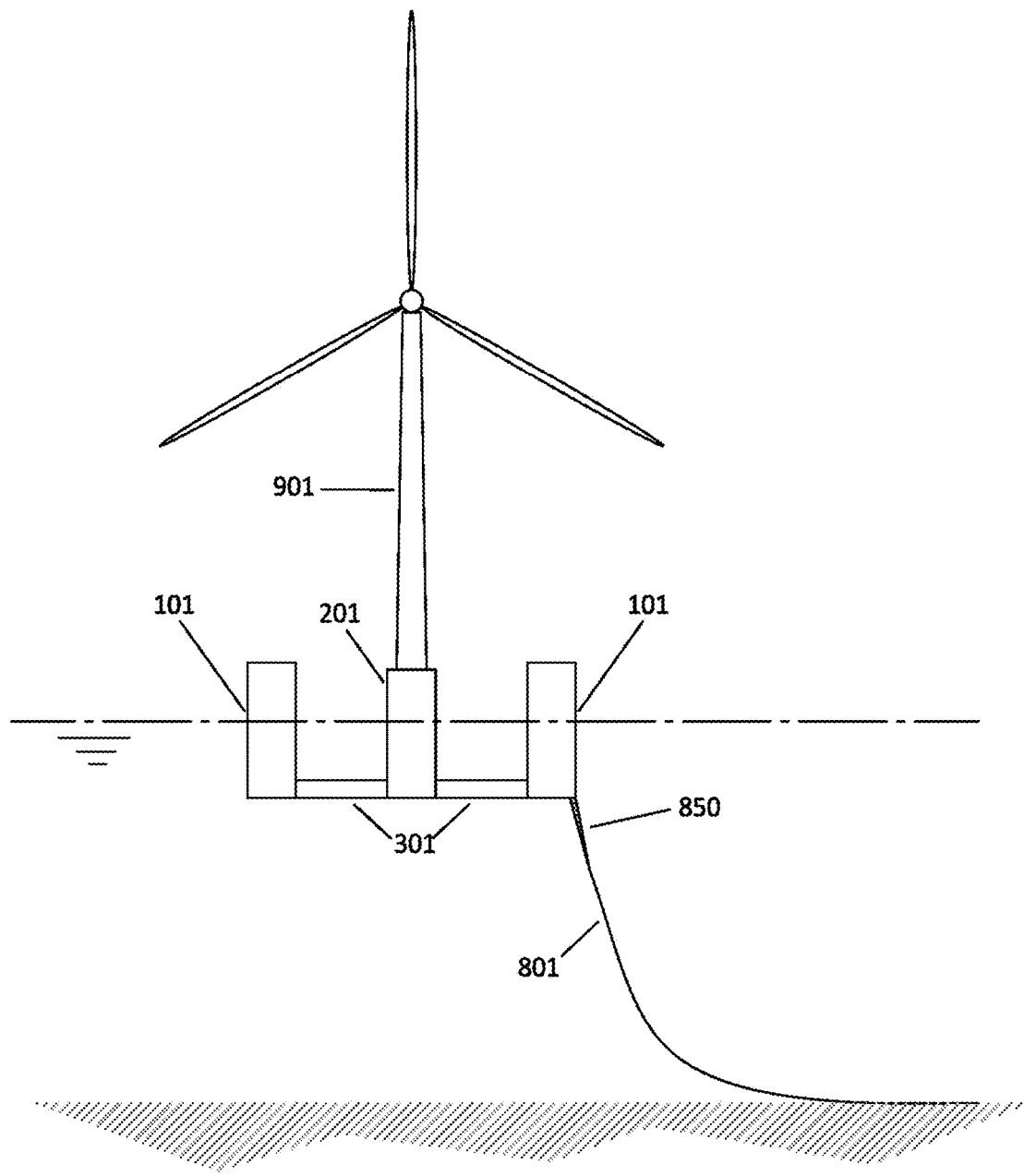
FIG. 23A is an elevation view showing a free hanging export power cable according to an embodiment of the disclosure.
Figure 23B:
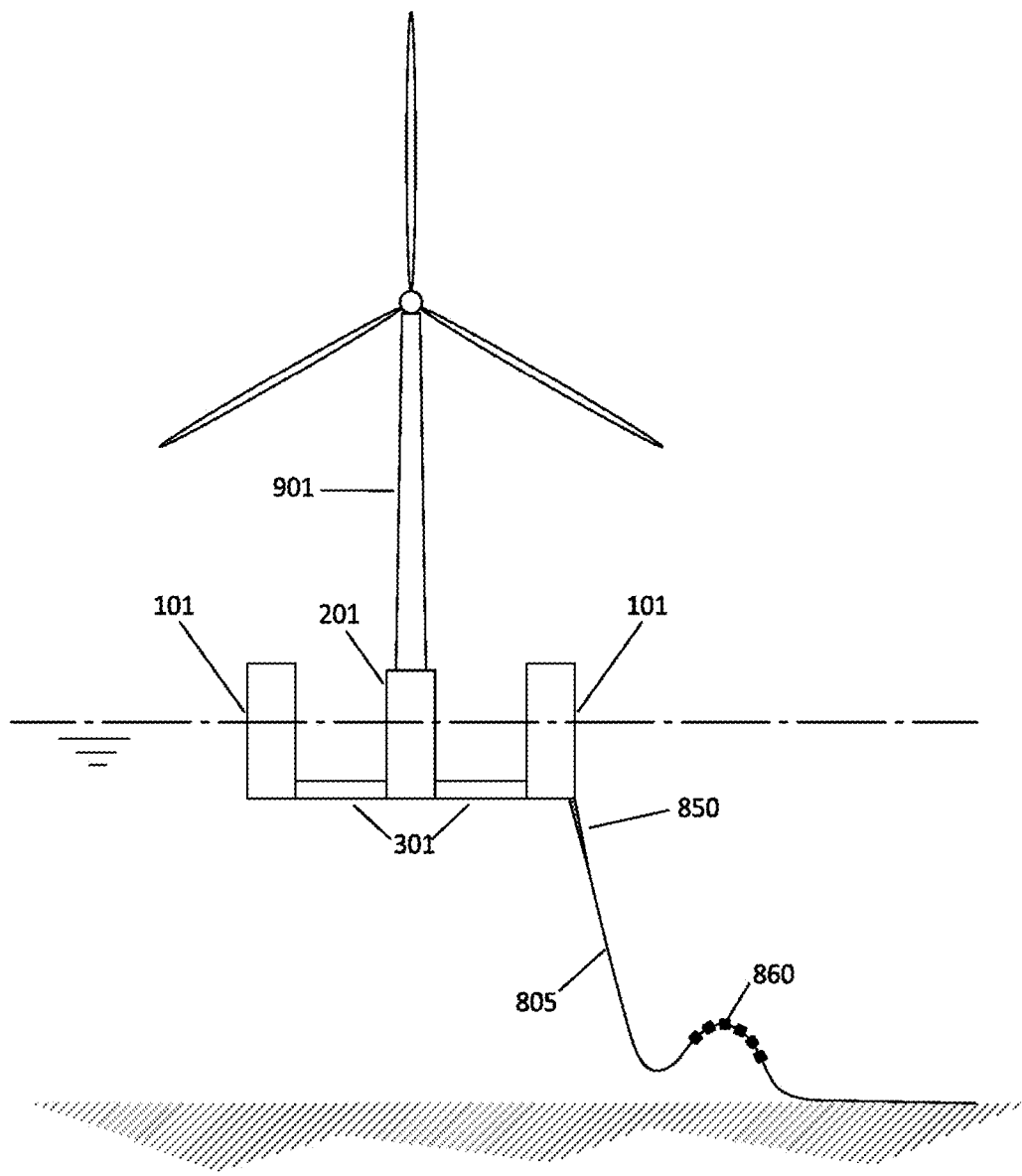
FIG. 23B is an elevation view showing a single arch supported export power cable according to an embodiment of the present disclosure.

With reference to FIGS. 23A and 23B, export power cable from the floating foundation may be free hanging cable 801 or arch-shaped cable 805 supported by buoyancy modules 860 in the water column. Export power cables 801, 805 may touch the seabed and may be connected to a shore-bound power cable (not shown) that is laid toward on the seabed or they may form a lazy wave via the buoyancy modules 860 similar to the inter-array power cables 820, 830 shown in FIGS. 21B and 21C, respectively.

Arches for inter-array power cables 810 or and export power cables 805 may comprise a system of buoyant coatings (not shown), buoyant cable sleeves (not shown) or buoyant modules 860 that are free floating or bottom moored. While the exemplary drawings show single or dual arches using a plurality of buoyant modules only, it is apparent to one of skilled in art that multiple arches may be employed using aforementioned structures and deemed necessary for various situations and implementations.

The number and location of the buoyancy modules 860 in a power cable 820, 805 may be determined based on a variety of factors, including cost of the cable material, strength of the cable material, distance between the floating foundations and/or the station, depth, wave velocities, and wave length of the sea in which the floating foundations are deployed, buoyant force of the buoyancy modules, etc. Considering these factors, the number and location of the buoyancy modules 860 may be determined such that when the power cable 820, 805 is deployed in the sea, the power cable 820, 805 is located below the wave-action zone, i.e., in the optimal submergence range.

According to hydrodynamic theory, the wave velocities in deep-water are attenuated exponentially and thus the wave motions which become negligible beneath a depth about half the wave length. Also at a depth of ⅙ of wave length, the wave velocities reduce to about 35% of the surface velocities, according to a formula:

$$u \propto \exp\left(-\frac{2\pi}{L}z\right)$$

where u=wave velocity; L=wave length; and z=depth below the water surface.

Here, the wave length may be derived from an average wave period or a spectral wave peak period of the water body. More particularly, the wave period of the water body may be measured based on a 50 year storm.

In order to optimize cable depth location, factors such as storm design condition and associated storm waves, distance between platforms, and cable size and properties need to be considered into the determination of the optimal cable depth location in the water column. A cable system installed at a very deep submergence requires a long cable, resulting in high cable cost. Conversely, a cable installed at a shallow depth will be subjected to more wave energy resulting in higher cable tensions which will in turn require more expensive cable and impart larger dynamic loads on the platform. The optimal cable depth will then define the number and location of buoyancy modules on the power cable.

The optimal power cable submergence is between ⅙ wave length to 1 wave length in depth, and more particularly, the optimal average submergence of the power cable is about ½ wave length. The cable system installed at this depth range is unlikely to be disturbed by the waves and thus maintains its stable configuration, resulting in low wave-induced loads on the cable and also resulting in a low probability of a cable damage during the storm.

Figure 24:
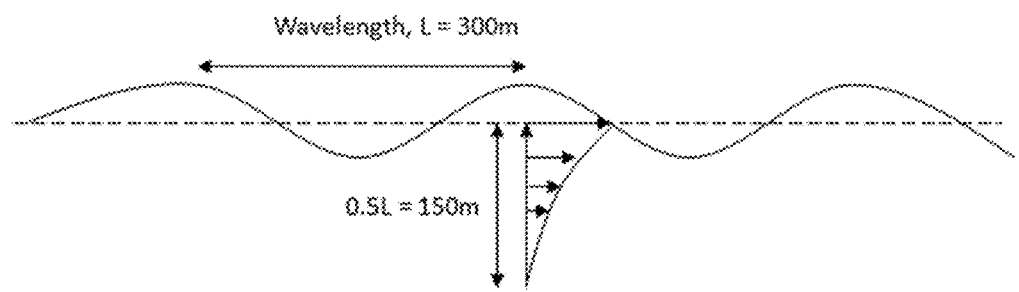
FIG. 24 is a diagram illustrating wave length and wave velocities of a water body.

For example, as shown in FIG. 24, for a 50 year storm having a spectral wave peak period (Tp) of 14 seconds, its associated wave length (L) will be about 300 m, calculated from a formula:

$$L=1.56*Tp^2$$

Figure 25A:
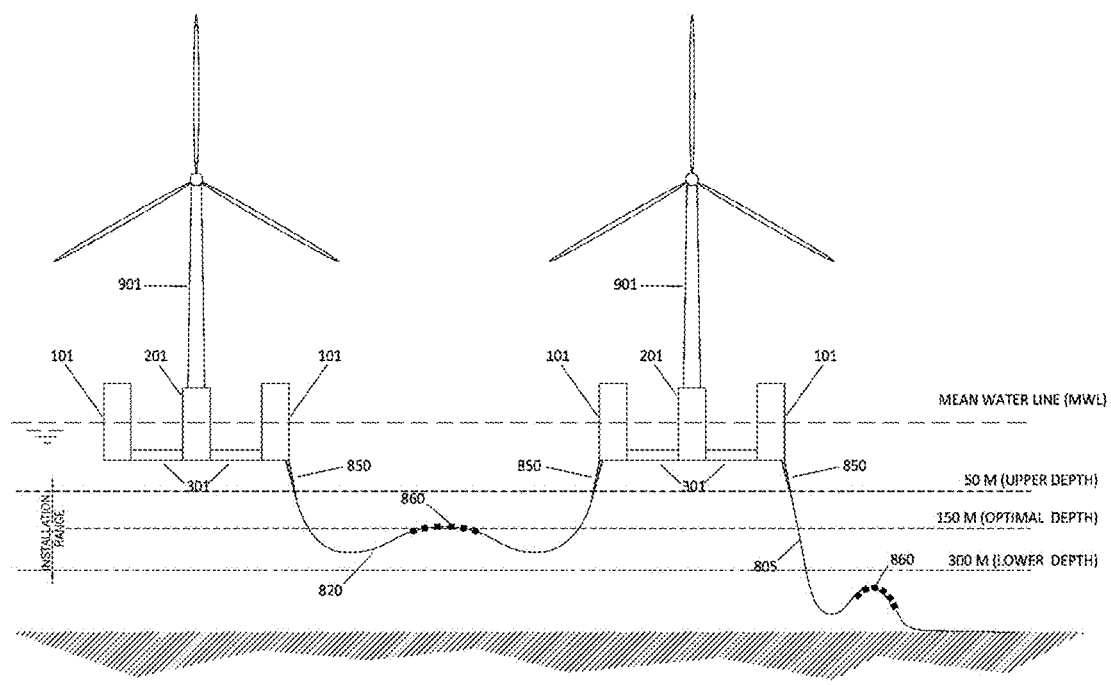
FIGS. 25A and 25B are elevation views of FIGS. 21B and 21C illustrating an example of an optimal submergence range of inter-array power cables.
Figure 25B:
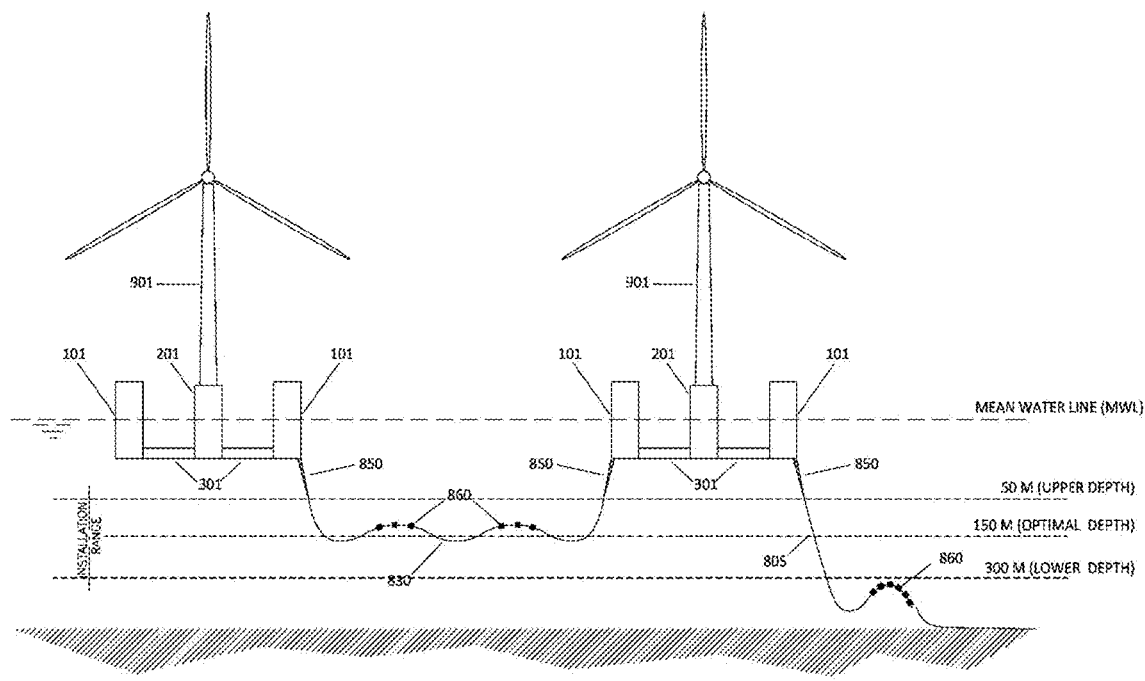

In this example (where Tp=14 sec, L=300 m), the optimal power cable submergence range is from 50 m (upper depth, ⅙ of wave length 300 m) to 300 M (lower depth, 1 wave length, 300 m), and the optimal average submergence of the power cable is 150 m (½ wave length). FIGS. 25A and 25B illustrate this example of the configured inter-array power cables submerged at a depth from 50 m to 300 m underneath the sea surface. The number and location of the buoyancy modules 860 may be adjusted on the power cable 820, 805 to accommodate the circumstances and environment of the floating foundations.

Such network of floating foundations having an inter-array cable with buoyancy modules and located in the optimal power cable submergence range would minimize the costs for cable material/length and also minimize dynamic loads caused by the wave velocities and cable weight. The power cable system installed at this depth range is unlikely to be disturbed by the waves and thus maintains a stable lazy wave configuration, resulting in low wave-induced loads on the cable and also resulting in a low probability of a cable damage during the storm. Further, since the power cables do not hang freely and installation of a power cable system at very deep submergence can be avoided, costs can be reduced.

While the drawings show the inter-array power cable 820, 830 as being located in the optimal power cable submergence range, the buoyancy modules 860 of the export power cable 805 may also be similarly adjusted so that the export power cable 805 is located in the optimal power cable submergence range.

Further, the drawings show optimal departure angle of mooring lines, optimal hang-off angles of power cables, and buoyancy modules 860 applied to semi-submersible floating foundations. However, when applicable, aspects of the present disclosure same may be applied to power cables of spar, TLP, and barge types in similar manner to achieve the advantages of the present disclosure. It will be apparent to one with skill in the art that the floating foundations, station keeping systems, and power cable implementations of the present disclosure may be provided using some or all of the aforementioned features without departing from the spirit and scope of the present disclosure. It will also be apparent to the skilled artisan that the embodiments described above are specific examples of a broader disclosure which may have greater scope than any of the singular descriptions taught. There may be many alterations, substitutions, and applications made in the embodiments of the present disclosure without departing from the spirit and scope of the present disclosure.

What is claimed is:

1. A floating foundation for supporting a wind turbine, the floating foundation comprising:
    a column extending upwardly and couplable at a top end thereof to a base of the wind turbine;
    at least one power cable for exporting power generated from the wind turbine to another floating foundation or to an offshore/onshore station; and
    a plurality of buoyancy modules disposed along the at least one power cable,
    wherein a number and position of the plurality of buoyancy modules on the at least one power cable are adjusted to obtain an optimal hang-off angle of the at least one power cable.

2. The floating foundation of claim 1, wherein the at least one power cable is an inter-array power cable for transferring the generated power to or from the another floating foundation and/or an export power cable for exporting the generated power to the offshore or onshore station.

3. The floating foundation of claim 2, wherein when the inter-array power cable is in a connected configuration, a hang-off angle of the inter-array power cable is between 30 and 50 degrees with respect to a vertical axis of the column of the floating foundation to which the inter-array power cable is coupled.

4. The floating foundation of claim 2, wherein when export power cable is in a connected configuration, a hang-off angle of the export power cable is between 3 and 20 degrees with respect to a vertical axis of the column of the floating foundation to which the export power cable is coupled.

5. The floating foundation of claim 1, wherein the at least one power cable is located in an optimal submergence range of a water body in which the floating foundation is deployed, and
    wherein the number and position of the plurality of buoyancy modules on the at least one power cable are adjusted to place the at least one power cable in the optimal submergence range.

6. A floating foundation for supporting a wind turbine, the floating foundation comprising:
    a column extending upwardly and couplable at a top end thereof to a base of the wind turbine; and
    a station keeping system, wherein the station keeping system comprises:
        at least one semi-taut or taut mooring line detachably attached to the floating foundation at one end and detachably attached to a seabed anchor at an other end thereof; and
        fittings that connect the semi-taut or taut mooring line to the floating foundation and to the seabed anchor,
    wherein the at least one semi-taut or taut mooring line is configured to connect, disconnect, and reconnect to the fittings of the mooring line and of the seabed anchor, and
    wherein when the semi-taut or taut mooring line is connected to the floating foundation and the seabed anchor, a departure angle of the at least one semi-taut or taut mooring line is between 35 and 55 degrees with respect to a vertical axis of the column.

7. A system of floating foundations for supporting a plurality of wind turbines that generate power, the system comprising:
    a plurality of floating foundations; and
    at least one power cable that is an inter-array power cable for transferring generated power between the plurality of floating foundations and/or an export power cable for exporting the generated power to an offshore/onshore station,
    wherein each of the plurality of floating foundations comprises a column extending upwardly and couplable at a top end thereof to a base of a wind turbine,
    wherein a plurality of buoyancy modules are disposed along the at least one power cable, and
    wherein a number and position of the plurality of buoyancy modules on the at least one power cable are adjusted to obtain an optimal hang-off angle of the at least one power cable.

8. The system of claim 7, wherein when the inter-array power cable is in a connected configuration, a hang-off angle of the inter-array power cable is between 30 and 50 degrees with respect to a vertical axis of a column of a floating foundation to which the inter-array power cable is coupled.

9. The system of claim 7, wherein when export power cable is in a connected configuration, a hang-off angle of the export power cable is between 3 and 20 degrees with respect to a vertical axis of a column of a floating foundation to which the export power cable is coupled.

10. The system of claim 7, wherein the at least one power cable is located in an optimal submergence range of a water body in which the floating foundation is deployed, and
    wherein the number and positions of the plurality of buoyancy modules on the at least one power cable are adjusted to place the at least one power cable in the optimal submergence range.

11. A method of stabilizing a power cable connected to a floating foundation supporting a wind turbine, the method comprising:
    determining an optimal number and position of a plurality of buoyancy modules to be disposed on at least one power cable;
    installing the plurality of buoyancy modules in the at least one power cable according to the determined optimal number and position;
    deploying the floating foundation and the at least one power cable into a water body,
    wherein the at least one power cable is an inter-array power cable for transferring power generated by the wind turbine to or from another floating foundation and/or an export power cable for exporting the generated power to an offshore/onshore station, wherein the optimal number and position of the plurality of buoyancy modules are determined based on at least a distance between the floating foundation and the another floating foundation or the offshore/onshore station, and wherein the at least one power cable with the plurality of buoyancy modules is positioned in an optimal submergence range of the water body due to the number and position of the plurality of buoyancy modules.

12. The method of claim 11, wherein when the inter-array power cable is in a connected configuration, a hang-off angle of the inter-array power cable is between 30 and 50 degrees with respect to a vertical axis of a column of the floating foundation to which the wind turbine is coupled.

13. The method of claim 11, wherein when export power cable is in a connected configuration, a hang-off angle of the export power cable is between 3 and 20 degrees with respect to a vertical axis of a column of the floating foundation to which the wind turbine is coupled.

14. The method of claim 11, wherein the determining the optimal number and position of the plurality of buoyancy modules comprises:

determining the optimal submergence range of the water body based on an average wave period or a spectral wave peak period of the water body;

determining the optimal number and positions of the plurality of buoyancy modules based on at least the optimal submergence range and the distance between the floating foundation and the another floating foundation or the offshore/onshore station.

15. The floating foundation of claim 5, wherein the optimal submergence range has a depth of ⅙ to 1 wave length of the water body, wherein the wave length of the water body is calculated using the formula:

$$L=1.56*Tp^2,$$

where L is a wave length of the water body and Tp is a wave spectral peak period.

16. The floating foundation of claim 15, wherein an optimal average submergence of the at least one power cable is ½ of the wave length of the water body.

17. The system of claim 10, wherein the optimal submergence range has a depth of ⅙ to 1 wave length of the water body, wherein the wave length of the water body is calculated using the formula:

$$L=1.56*Tp^2,$$

where L is a wave length of the water body and Tp is a wave spectral peak period.

18. The system of claim 17, wherein an optimal average submergence of the at least one power cable is ½ of the wave length of the water body.

19. The method of claim 11, wherein the optimal submergence range has a depth of ⅙ to 1 wave length of the water body, wherein the wave length of the water body is calculated using the formula:

$$L=1.56*Tp^2,$$

where L is a wave length of the water body and Tp is a wave spectral peak period.

20. The method of claim 19, wherein an optimal average submergence of the at least one power cable is ½ of the wave length of the water body.

* * * * *